United States Patent [19]

Moribe et al.

[11] Patent Number: 4,982,342

[45] Date of Patent: Jan. 1, 1991

[54] IMAGE PROCESSOR SYSTEM HAVING MULTIFUNCTION LOOK-UP TABLE UNITS

[75] Inventors: Hiroshi Moribe, Nagoya; Kazutoshi Sukigara, Aichi; Masaru Nakano, Nagoya; Toshio Kato, Toyoake; Yoshiaki Ito, Toyota, all of Japan

[73] Assignee: Kabushiki Kaisha Toyota Chuo Kenkyusho, Aichi, Japan

[21] Appl. No.: 266,903

[22] Filed: Nov. 3, 1988

[30] Foreign Application Priority Data

Nov. 5, 1987 [JP] Japan .................. 62-279696
Nov. 17, 1987 [JP] Japan .................. 62-290386
Nov. 19, 1987 [JP] Japan .................. 62-294651

[51] Int. Cl.⁵ .................... G06F 15/66; G06K 9/46
[52] U.S. Cl. ................... 364/518; 382/21; 382/27; 358/455
[58] Field of Search ............... 364/518, 521; 358/282, 358/429, 455, 458, 465; 382/21, 22, 27, 42

[56] References Cited

U.S. PATENT DOCUMENTS

| | | | |
|---|---|---|---|
| 4,385,318 | 5/1983 | Miller | 358/106 |
| 4,538,299 | 8/1985 | De Forest | 382/21 |
| 4,695,884 | 9/1987 | Anastassiou et al. | 358/163 |
| 4,790,026 | 12/1988 | Gennery et al. | 382/49 |
| 4,791,675 | 12/1988 | Deering et al. | 382/18 |
| 4,817,175 | 3/1989 | Tenenbaum et al. | 382/41 |

FOREIGN PATENT DOCUMENTS 60-235279 11/1985 Japan.
61-80464 11/1986 Japan.

OTHER PUBLICATIONS

Image Preprocessor of Model-Based Version System for Assembly Robots, Computer Society of IEEE, 1987, pp. 366-371.

Primary Examiner—Dale M. Shaw
Assistant Examiner—Raymond J. Bayerl
Attorney, Agent, or Firm—Burgess, Ryan & Wayne

[57] ABSTRACT

In an image processor system, a processor includes a first two-dimensional look-up table for receiving first and second digital data as an address, a second two-dimensional look-up table for receiving an output digital data of the first two-dimensional look-up table and a third digital signal as an address, and a latch circuit for temporarily storing the output digital data of the second look-up table. The processor is flexible and the functions thereof can be varied by changing the contents of the look-up tables.

26 Claims, 30 Drawing Sheets

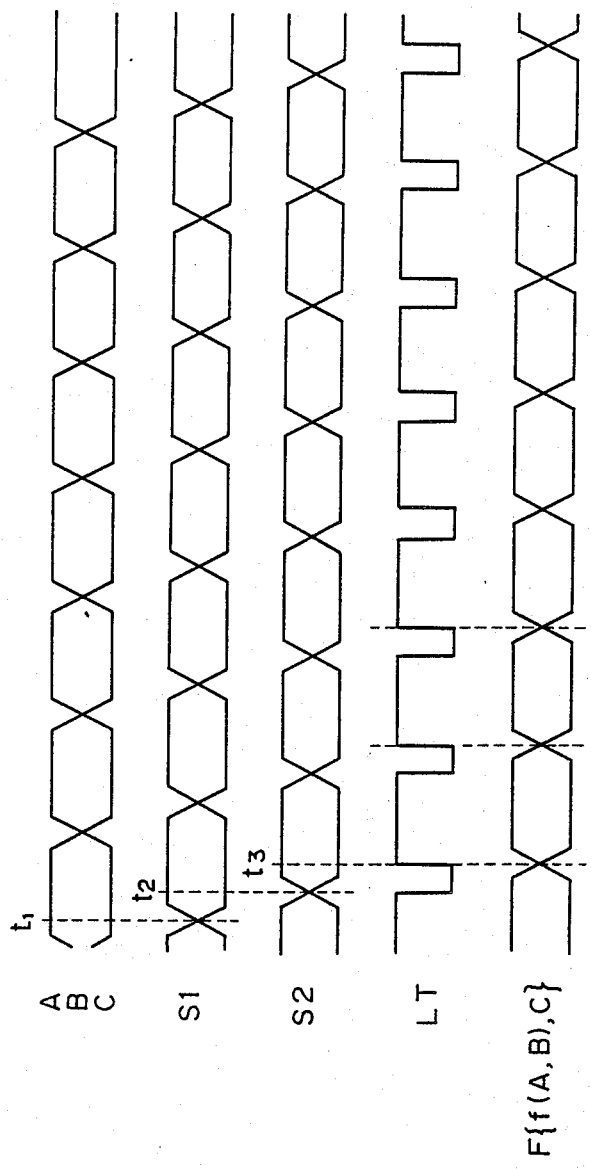

| $E_1$ | $E_2$ | $E_3$ |
|---|---|---|
| $E_0$ | $E$ | $E_4$ |
| $E_7$ | $E_6$ | $E_5$ |

| $\theta_1$ | $\theta_2$ | $\theta_3$ |
|---|---|---|
| $\theta_0$ | $\theta$ | $\theta_4$ |
| $\theta_7$ | $\theta_6$ | $\theta_5$ |

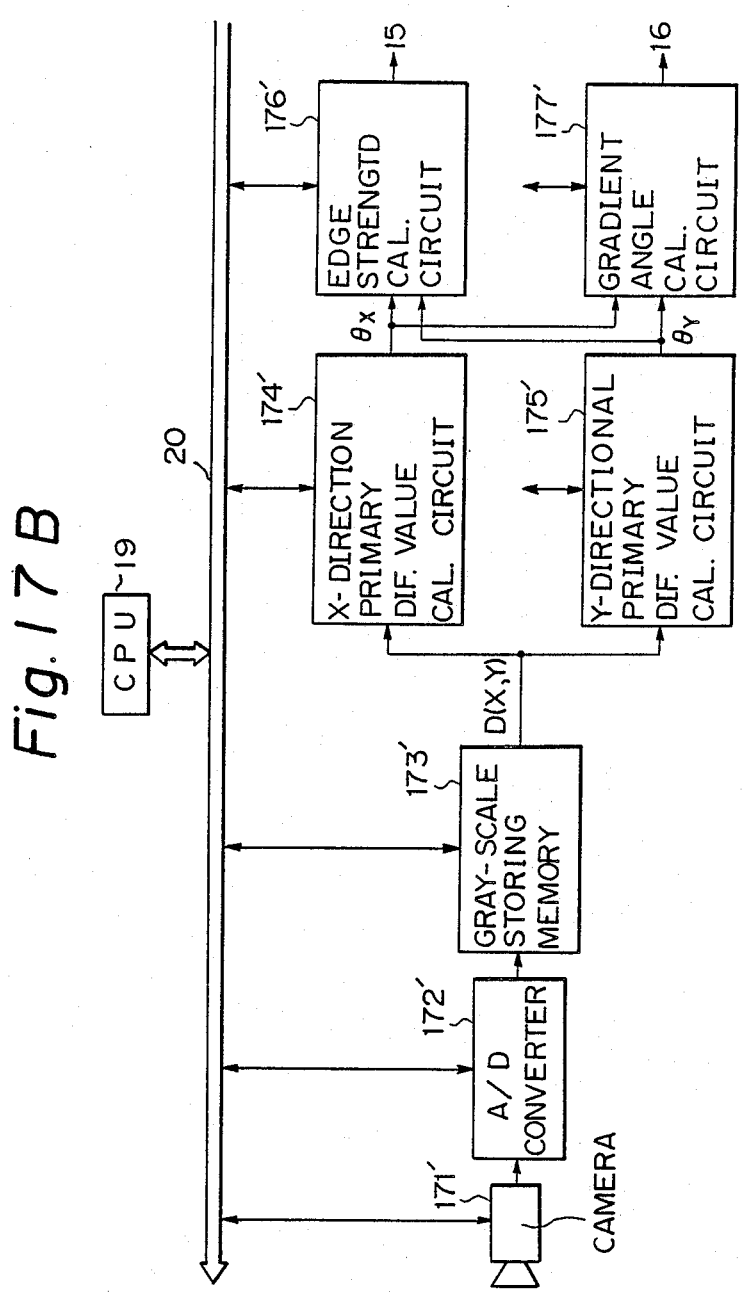

Fig. 18

| (X, Y) | RLB |
|---|---|
| (0, 0) | "0" |
| (1, 0) | "0" |
| (2, 0) | "1" |
| ⋮ | ⋮ |
| (255, 255) | "0" |

18

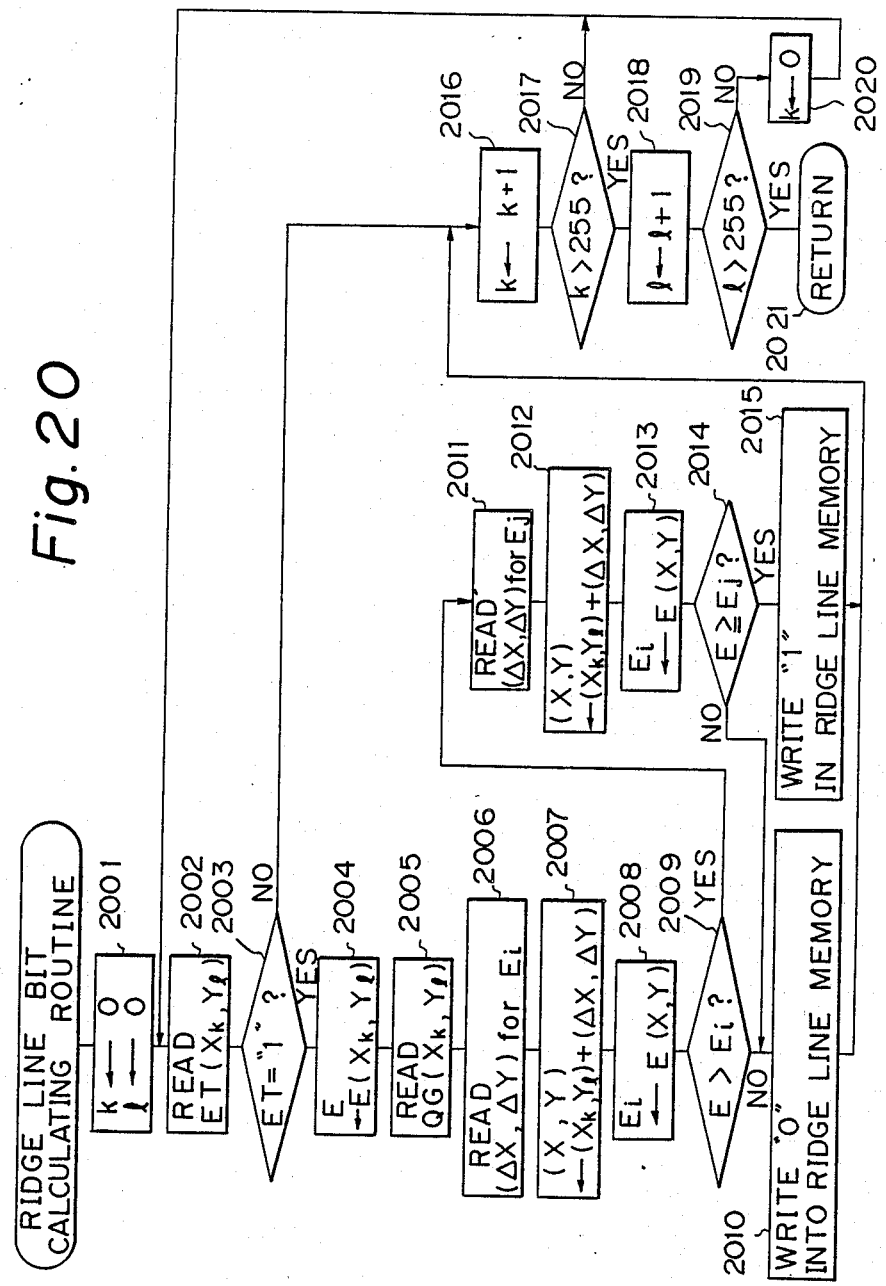

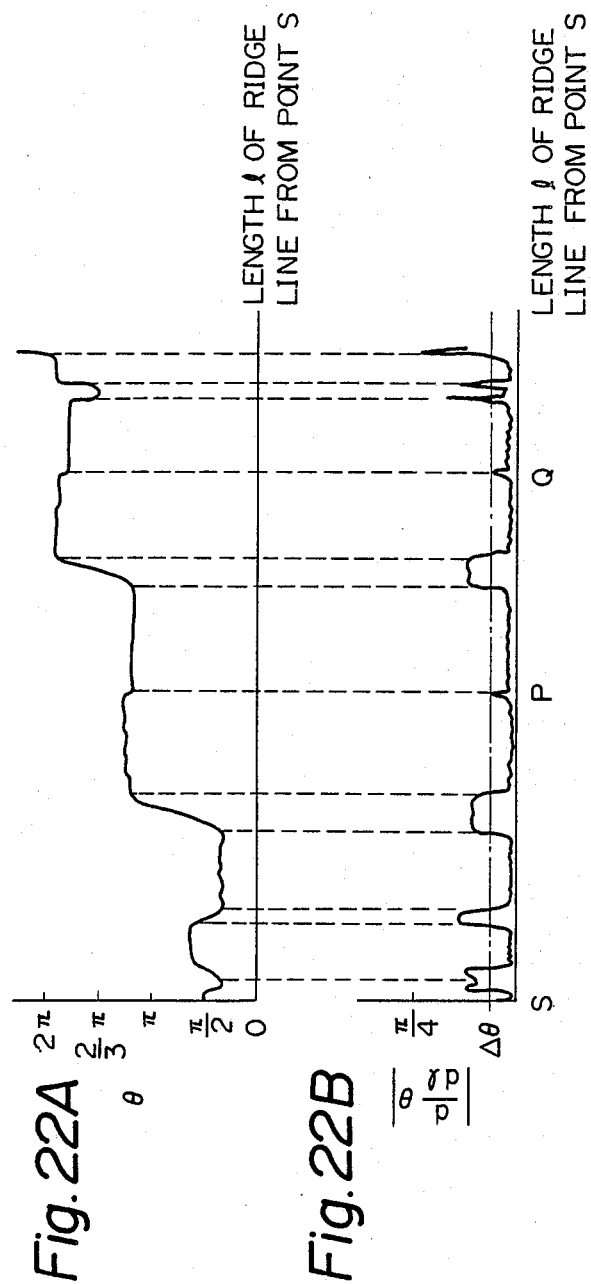

IMAGE PROCESSOR SYSTEM HAVING MULTIFUNCTION LOOK-UP TABLE UNITS

BACKGROUND OF THE INVENTION (1) Field of the Invention

The present invention relates to an image processor system having look-up tables for gray-scale digital pictures. More particularly, it relates to an image processor system applied to a Hough conversion system, an edge extraction system and a polygon segmentation system for gray-scale digital pictures.

(2) Description of the Related Art

In an image processor system, various basic functions, such as a gradation conversion, a special differential operation, a convolution calculation, edge level calculation, gradient angle calculation, and a Hough conversion calculation, are carried out, and in the prior art, one type of processor is provided for each of the basic functions. Namely, a processor used for one basic function cannot be used for other basic functions. Therefore, to assemble an image processor system, a large number of special purpose processors are required, thus increasing the hardware and the manufacturing cost thereof.

SUMMARY OF THE INVENTION

An object of the present invention is to provide a flexible and expansible processor able to be used for various base functions.

Another object of the present invention is to provide an image processor system using the above-mentioned flexible and expansible processors.

According to the present invention, a basic processor unit for an image processor system comprises two look-up tables and a latch circuit. These look-up tables are two-dimensional (two-input type), i.e., one of the look-up tables receives first and second digital data as an address and generates an output digital signal, and the other receives the output digital signal of the first look-up table and a third digital data as an address signal and generates an output digital signal. This output digital signal is stored in the latch circuit. The processor is flexible and the functions thereof can be increased by changing the contents of the look-up tables, and thus various types of basic functions can be carried out by using this processor.

BRIEF DESCRIPTION OF THE DRAWINGS

The present invention will be more clearly understood from the description set forth below with reference to the accompanying drawings, wherein:

FIG. 4 is a timing diagram showing the operation of the unit of FIG. 3;

FIG. 17B is a block circuit diagram of a modification of FIG. 17A;

FIG. 18 is a diagram of the ridge line memory of FIG. 17A;

FIG. 20 is a flow chart of the ridge line extracting operation according to the present invention;

FIGS. 22A and 22B are diagrams of the gradient angle $\theta$ change $d\theta/dl$ V.S. length l of a ridge line from point S;

DESCRIPTION OF THE PREFERRED EMBODIMENTS

Before the description of the embodiments of this invention, prior art processors for an image processor system will be explained with reference to FIGS. 1 and 2 (see: Unexamined Japanese Patent Publication (Kokai) No. 61-80464).

Figure 1:
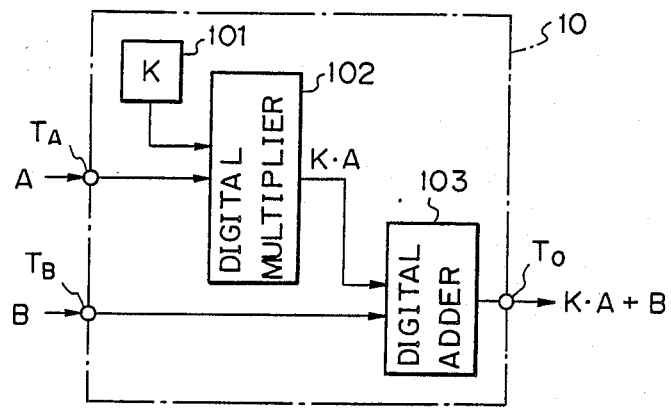
FIGS. 1 and 2 are circuit diagrams illustrating prior art processor units.

In FIG. 1, a processor 10 comprises a digital constant register 101, a digital multiplier 102, and a digital adder 103. The digital multiplier 102 multiplies an input digital signal A supplied to a terminal (or connector) $T_A$ with the digital data K stored in the digital constant register 101, and generates an output signal K·A. The digital adder 103 adds the digital data supplied to a terminal $T_B$ to the output signal K·A of the digital multiplier 102, and generates an output K·A+B at an output terminal $T_O$. Accordingly, this processor functions as a multiplication/addition processor.

Figure 2:
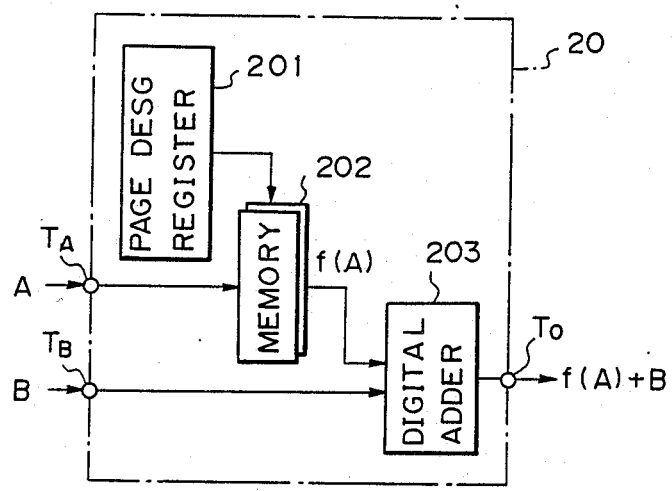

In FIG. 2, a processor 20 is comprised of a page designating register 201, a one-dimensional memory 202, and a digital adder 203. The memory 202 converts an input digital signal A supplied to a terminal $T_A$ with a function designated by the page designating register 201, which corresponds to a level of the signal A, and generates an output signal f(A). The digital adder 202 adds the output signal f(A) to an input digital signal B supplied to a terminal $T_B$, and generates an output signal f(A)+B at an output terminal $T_O$. Accordingly, this processor functions as a gray-scale processor.

Nevertheless, even if the plurality of processors illustrated in FIGS. 1 and 2 are combined, only a multiplication/addition processor or a gray-scale processor can be obtained, and as a result, if processors for other special purposes are required, the hardware itself must be supplemented, and thus the number of types of hardware must be increased.

It should be noted that an operational amplifier serves as a basic unit in an analog circuit, and a comparator or the like serves as a basic unit in a digital circuit; i.e., a combination of such basic units makes it possible to realize a complex circuit having more functions.

In an image processor system according to the present invention, various functions are divided into basic functions and a basic processor unit is used commonly for these basic functions, and as a result, various functions can be realized by a combination of the plurality of basic processor units, thus reducing the cost of an image processor system.

Figure 3:
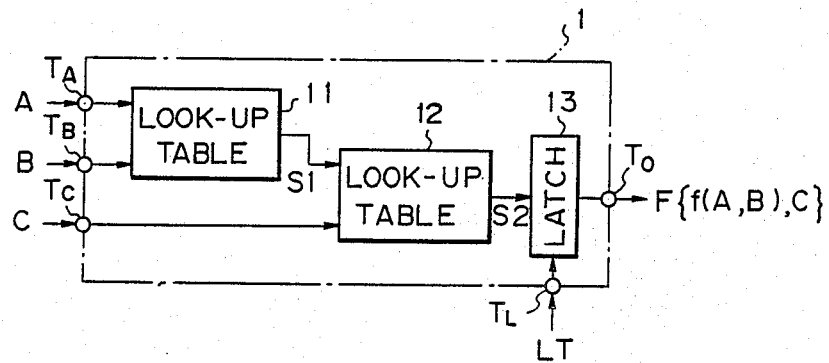
FIG. 3 is a circuit diagram illustrating a first embodiment of the basic processor unit according to the present invention.

In FIG. 3, which illustrates a first embodiment of the basic processor unit according to the present invention, two look-up tables 11 and 12, and a latch circuit 13 are provided. Each of the look-up tables 11 and 12 comprises two-dimensional read-only memories (ROMs) or random access memories (RAMs). Note, such a two-dimensional look-up table is accessed by two kinds of input address signals as one address, and as a result, data is read from an area indicated by this address. In this case, when the look-up table 11 receives an input signal (8 bits) A supplied to a terminal (or connector) $T_A$ and an input signal (8 bits) B supplied to a terminal $T_B$, the look-up table 11 is accessed by a 16-bit address defined by the input signals A and B, and as a result, generates an 8-bit output signal S1. Similarly, when the look-up table 12 receives the 8-bit output signal S1 of the look-up table 11 and an input signal (8 bits) C supplied to a terminal $T_C$, the look-up table 12 is accessed by a 16-bit address defined by the output signal S1 and the input signal C, and as a result, generates an 8-bit output signal S2. The 8-bit output signal S2 is stored in the latch circuit 13 by a latch timing signal LT supplied to a terminal $T_L$.

The operation of the unit 1 of FIG. 3 will be explained with reference to FIG. 4. The input signals $T_A$, $T_B$, and $T_C$ are supplied simultaneously to the terminals $T_A$, $T_B$, and $T_C$, respectively. Then at a time $t_1$, when a definite time period has passed after the switching of the input signals A, B, and C, the output signal S1 is generated from an area of the look-up table 11 indicated by a 16-bit address defined by the input signals A and B. In this case, the data of the output signal S1 can be represented by $$f(A, B)$$

where f(A, B) is a two-dimensional function of the input signals A and B.

Further, since the output signal S1 of the look-up table 11 and the input signal C are supplied to the look-up table 12, at a time $t_2$, the output signal S2 is generated from an area of the look-up table 12 indicated by a 16-bit address defined by the output signal S1 and the input signal C. In this case, the data of the output signal S2 can be represented by $$F\{f(A, B), C\}$$

where F is a two-dimensional function of the function f and the input signal C. Then, at a time $t_3$, the output signal S2 is temporarily stored in the latch circuit 13 by the latch timing signal LT, and accordingly, the 8-bit data F{f(A, B), C} is obtained at the terminal $T_O$.

Thus, in the basic processor unit 1 of FIG. 3, when the three input signals A, B, and C are supplied thereto, the three-dimensional function F of the three signals A, B, and C is obtained.

In the basic processor unit 1 of FIG. 3, the operation accuracy is voluntarily determined. Therefore, if the input signals A, B, and C and the output signal F are all 4 bits, the basic processor unit 1 of FIG. 3 has a capacity of $2^{13}$ bits ($=2^4 \times 2^4 \times 2^4$ bits $\times 2$), while a basic processor unit formed by one three-dimensional (three-input type) look-up table has a capacity of $2^{16}$ ($=2^4 \times 2^4 \times 2^4 \times 2^4$ bits). Therefore, the scale of the basic processor unit 1 is reduced by $\frac{1}{8}$. Also, if the input signals A, B, and C and the output signal F are all 8 bits, the basic processor unit 1 of FIG. 3 has a capacity of $2^{25}$ bits ($=2^8 \times 2^8 \times 2^8$ bits $\times 2$), while a basic processor unit formed by one three-dimensional look-up table has a capacity of $2^{32}$ ($=2^8 \times 2^8 \times 2^8 \times 8$ $2^8$bits). Therefore, the scale of the basic processor unit 1 is reduced by 1/128. Further, if the input signals A, B, and C and the output signal F are all 16 bits, the basic processor unit 1 of FIG. 3 has a capacity of $2^{49}$ bits ($=2^{16} \times 2^{16} \times 2^{16}$ bits $\times 2$), while a basic processor unit formed by one three-dimensional "look-up" table has a capacity of $2^{64}$ ($=2^{16} \times 2^{16} > 2^{16} \times 16 \times 2^{16}$ bits). Therefore, the scale of the basic processor unit 1 is reduced by 1/32768.

Note that the functions f and F are voluntary functions which may represent four arithmetic operations, trigonometric functions, n-th root calculations, exponential/logarithmic calculations and the like, individually or in combination. For example, in an image processor system, the input signals A and B correspond to X-direction and Y-direction gradient components of a brightness vector at a pixel. Also, the function f is an absolute value of the brightness vector, a vector angle, a cosine value of the vector angle, a sine value of the vector angle, or the like. Further, the function F is a δ-function dependent upon the input signal C, i.e., $$F\{f(A, B), C\} = f(A, B) \cdot \delta(C)$$

Figure 5:
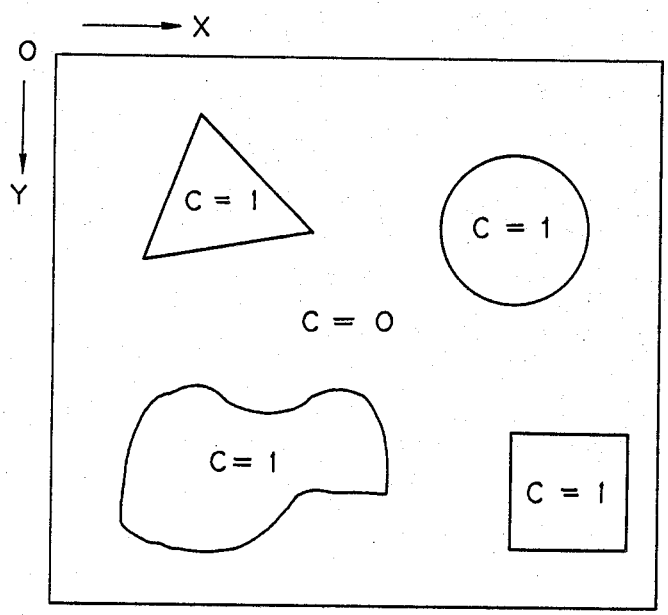
FIG. 5 is a diagram showing a window processing by the unit of FIG., 3.

If the signal C is defined in accordance with the pixel address (X, Y) as illustrated in FIG. 5, the output signal S2 is f(A, B) only within voluntary areas (C=1) in a frame, thus realizing a window processing.

Figure 6:
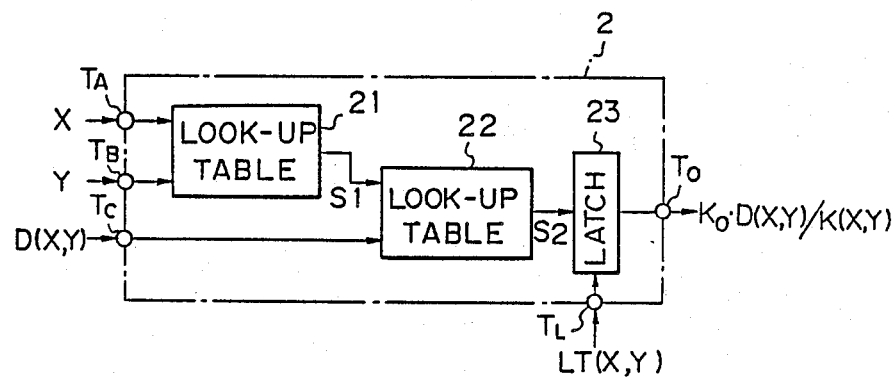
FIGS. 6 and 7 are circuit diagrams illustrating second and third embodiments of the basic processor unit according to the present invention.

In FIG. 6, which illustrates a second embodiment of the basic processor unit according to the present invention, there is provided a gradiation conversion processor 2 which comprises look-up tables 21, and 22 and a latch circuit 23. Although the sensitivity K(X, Y) is different in the conventional CCD television camera, this gradation conversion processor 2 can correct fluctuation of the image data due to a nonuniformity of the sensitivity. Namely, if the address of a pixel is given as (X, Y), the sensitivity thereof is K(X, Y), and the total number of pixels in a picture is N and, therefore, the mean sensitivity $K_0$ is given by $$K_0 = \sum_X \sum_Y K(X, Y)/N.$$

Accordingly, as shown in FIG. 6, an address signal X is supplied to a terminal $T_A$, and an address signal Y is supplied to a terminal $T_B$. In this case, $K_0/K(X, Y)$ is written in advance into an area of the look-up table 21 indicated by the address (X, Y), and therefore, the look-up table 21 generates an output signal S1 which expresses $K_0/K(X, Y)$. The signal S1 ($=K_0/K(X, Y)$) together with a gray-scale image signal D(X, Y) is supplied to the look-up table 22. In this case, a product value between the two input signals is written in advance into a corresponding area of the look-up table 22, and therefore, the look-up table 22 generates an output signal S2 which expresses $(K_0/K(X, Y)) \cdot D(X, Y)$ ($=K_0 \cdot D(X, Y)/K(X, Y)$). Thus, since the sensitivity of the CCD television camera or the like can be set to a definite value, image data very close to an actual image can be obtained. Also, the data $K_0/K(X, Y)$ is a two-dimensional distribution function, and therefore, if the value $K_0$ is enlarged for a plurality of voluntary regions and the value $K_0$ is reduced for other regions, only the image data within the given voluntary regions can be strengthened.

Figure 7:
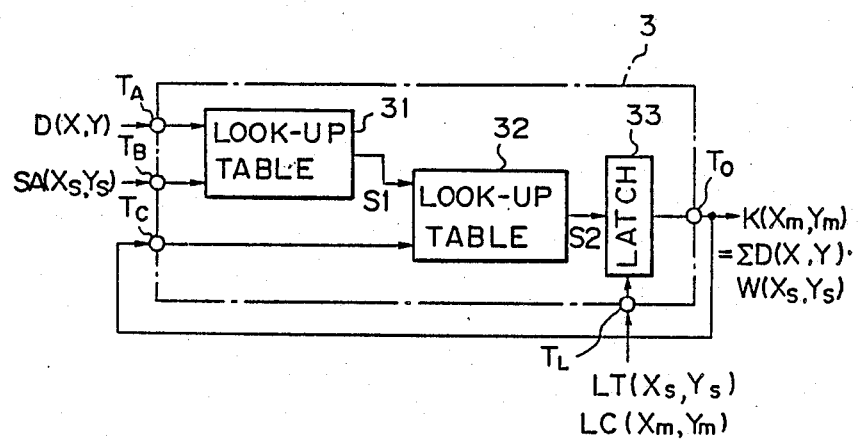

In FIG. 7, which illustrates a third embodiment of the basic processor unit according to the present invention, a basic processor unit 3 as a space filter for calculating a convolution is provided. This basic processor unit 3 also comprises two look-up tables 31 and 32, and a latch circuit 33, thus realizing a space filter for a p rows×q columns matrix of pixels in accordance with a sub scanning address signal $SA(X_s, Y_s)$. In FIG. 7, an address signal (X, Y) of a gray-scale pixel signal D(X, Y) is a sum of a main scanning address $(X_m, Y_m)$ of a television camera and a sub scanning address $(X_s, Y_s)$ within the p×q matrix; i.e., $$(X, Y) = (X_m, Y_m) + (X_s, Y_s)$$
$$= (X_m + X_s, Y_m + Y_s)$$

A product value between the value of the gray-scale signal D(X, Y) and a weight coefficient $W(X_s, Y_s)$ corresponding to the sub scanning address signal $SA(X_s, Y_s)$ is written in advance into an area of the look-up table 31 indicated by an address formed by D(X, Y) and $SA(X_s, Y_s)$. Also, a sum of the output $S2(=D(X, Y) \cdot W(X_s, Y_s))$ of the look-up table 31 and a convolution output $(\Sigma D(X, Y) \cdot W(X_s, Y_s))$ is written in advance into an area of the look-up table 32 indicated by an address formed by $D(X, Y) \cdot W(X_s, Y_s)$ and $\Sigma D(X, Y) \cdot W(X_s, Y_s)$.

Further, as shown in FIG. 7, a latch timing signal $LT(X_s, Y_s)$ and a latch clear signal $CL(X_m, Y_m)$ are supplied via a terminal $T_L$ to the latch circuit 33. In this case, the terminal $T_L$ is actually two terminals, and the latch circuit 33 actually has a latch timing port and a latch clear port, but only one terminal and only one port are illustrated, for simplicity.

Figure 8:
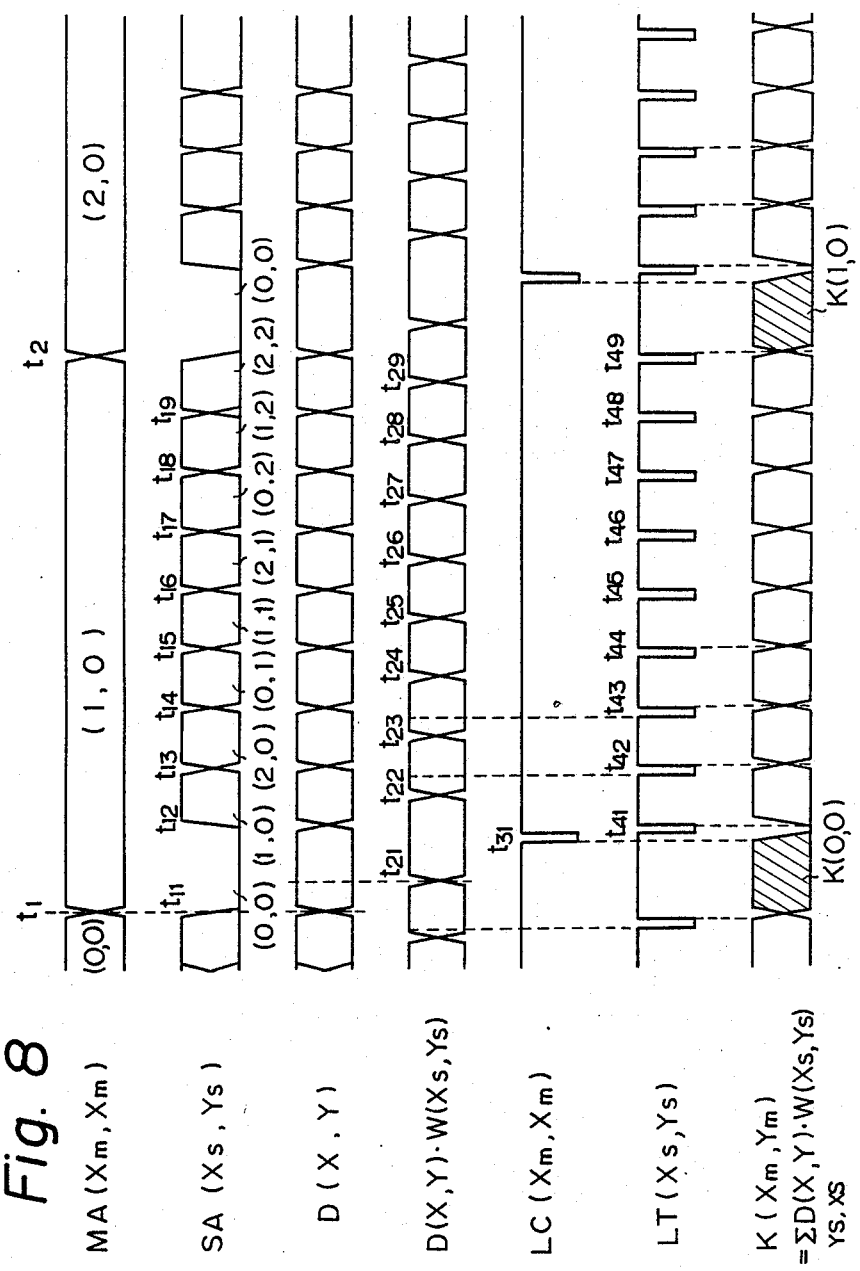
FIG. 8 is a timing diagram showing the operation of the circuit, of FIG. 7.

The operation of the unit 3 of FIG. 7 will be explained with reference to FIG. 8. At the time $t_1, t_2, \ldots$, the main address $MA(X_m, Y_m)$ is changed. For example, if an image data is constructed by 256×256 pixels, the main scanning address MA is changed as follows: (0, 0), (1, 0), ..., (255, 0), (1, 0), ..., (255, 255). Also, at the time $t_1 (=t_{11}) t_{12}, t_{13}$, the sub scanning address SA is changed. For example, if a sub scanning matrix is constructed by 3×3 pixels, the sub scanning address $(X_s, Y_s)$ is changed as follows: (0, 0), (1, 0), (2, 0), ..., (2, 2). As a result, the address (X, Y) of the grayscale pixel signal D(X, Y) is changed simultaneously with the change of the sub scanning address SA as follows: $(X_m, Y_m), (X_m+1, Y_m), (X_m+2, Y_m), \ldots, (X_m+2, Y_m+2)$, and then, at the time $t_{21}, t_{22}, \ldots$, after a delay time period $\Delta t$, the look-up table 31 generates an output signal S1 represented by $$D(X_m, Y_m) \cdot W(0, 0),$$
$$D(X_m + 1, Y_m) \cdot W(1, 0),$$
$$\vdots$$
$$D(X_m + 2, Y_m + 2) \cdot W(2, 2).$$

The look-up table 32 and the latch circuit 33 serve as an accumulator for accumulating the output signal S1 of the look-up table 31. Namely, at the time $t_{31}$, the latch circuit 33 is cleared by the latch clear signal $CL(X_m, Y_m)$, and at the time $t_{41}, t_{42}, \ldots$, the latch circuit 33 stores the output signal S2 of the look-up table 32 which serves as an adder. Accordingly, at a final time $t_{49}$, the convolution output $K(X_m, Y_m)$ is obtained at the latch circuit 33; i.e., $$K(X_m, Y_m) = D(X_m, Y_m) \cdot W(0, 0)$$
$$+ D(X_m + 1, Y_m) \cdot W(1, 0)$$
$$\vdots$$
$$+ D(X_m + 2, Y_m + 2) \cdot W(2, 2)$$

Figure 9:
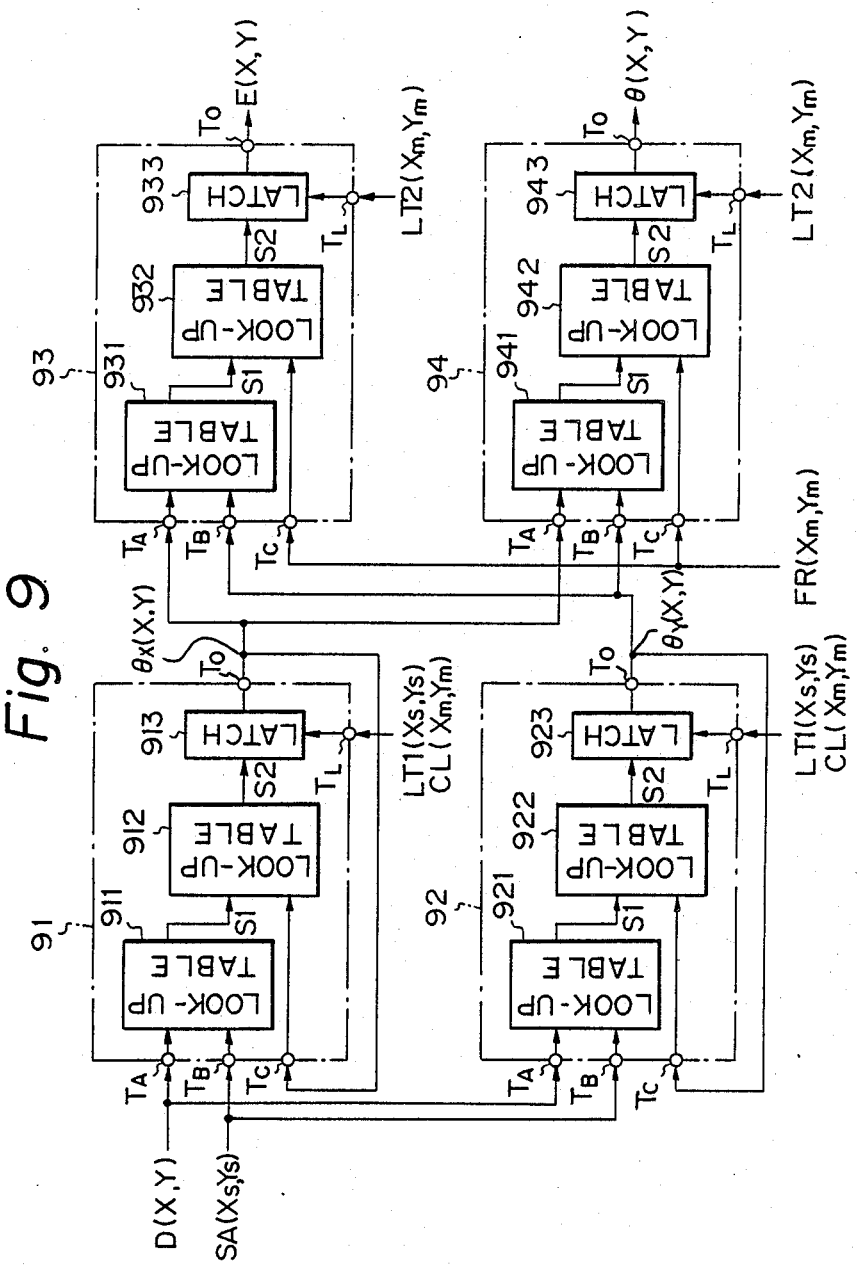
FIG. 9 is a circuit diagram illustrating an image processor system using a plurality of basic processor units according to the present invention.

FIG. 9 illustrates an image processor system including four basic processor units 91, 92, 93, and 94 according to the present invention. This image processor system is a pipeline type that calculates an edge strength signal E(X, Y) and a gradient angle $\theta(X, Y)$ from a gray-scale pixel signal D(X, Y). The four basic processor units 91, 92, 93, and 94 have the same configuration, i.e., two look-up tables 911, 912; 921, 922; 931, 932; and 941, 942, and a latch circuit 913, 923, 933, and 943. Also, the basic processor units 91 and 92 are the same as the basic processor 3 for the convolution calculation as shown in FIG. 7. For example, in a 3×3 sub matrix, to carry out an X-direction primary differential operation upon the basic processor unit 91, the weight coefficient $W(X_s, Y_s)$ of the look-up table 911 is defined as follows:

| Xs \ Ys | 0 | 1 | 2 |
|---|---|---|---|
| 0 | $\frac{1}{4}$ | $\frac{1}{2}$ | $\frac{1}{4}$ |
| 1 | 0 | 0 | 0 |
| 2 | $-\frac{1}{4}$ | $-\frac{1}{2}$ | $-\frac{1}{4}$ |

Also, to carry out a Y-direction primary differential operation upon the basic processor unit 92, the weight coefficient $W(X_s, Y_s)$ of the look-up table 92 is defined as follows:

| Xs \ Ys | 0 | 1 | 2 |
|---|---|---|---|
| 0 | $\frac{1}{4}$ | 0 | $-\frac{1}{4}$ |
| 1 | $\frac{1}{2}$ | 0 | $-\frac{1}{2}$ |
| 2 | $\frac{1}{4}$ | 0 | $-\frac{1}{4}$ |

Figure 10:
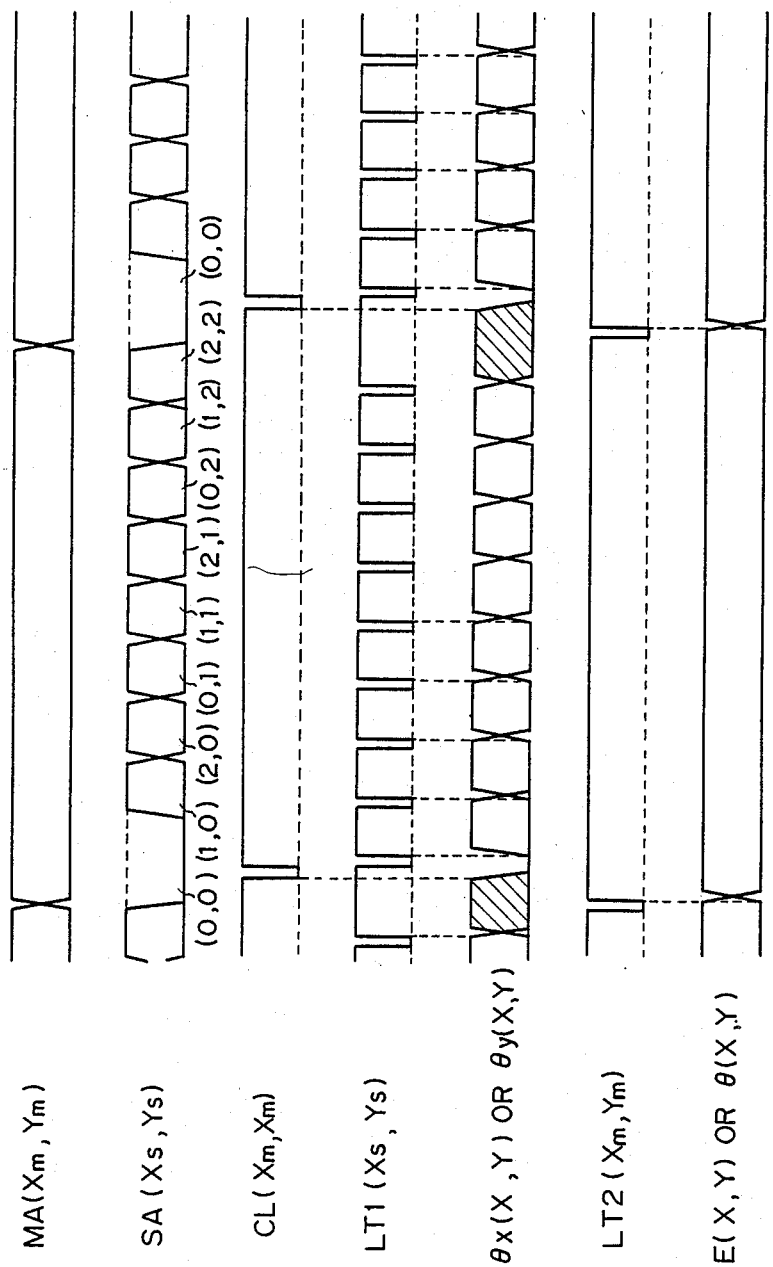
FIG. 10 is a timing diagram showing the operation of the circuit of FIG. 9.

Further, referring to FIGS. 9 and 10, the gray-scale pixel signal D(X, Y) and the sub scanning address signal $SA(X_s, Y_s)$ are supplied via the terminals $T_A$ and $T_B$, respectively, to the look-up table 911, and the latch circuit 913 is clocked at each sub scanning, i.e., by each latch timing signal LT1 $(X_s, Y_s)$, and is cleared at each main scanning, i.e., by each latch clear signal $CL(X_m, Y_m)$. Therefore, an X-direction primary differential value $\theta x(X, Y)$ of the gray-scale pixel signal D(X, Y) at the coordinates $(X_m, Y_m)$ is obtained at the terminal T0 of the basic processor unit 91. Similarly, the gray-scale pixel signal D(X, Y) and the sub scanning address signal $SA(X_s, Y_s)$ are supplied via the terminals $T_A$ and $T_B$, respectively, to the look-up table 921, and the latch circuit 923 is clocked at each sub scanning, i.e., by each latch timing signal LT1 $(X_s, Y_s)$ and is cleared at each main scanning, i.e., by each latch clear signal $CL(X_m, Y_m)$. Therefore, a Y-direction primary differential value $\theta Y(X, Y)$ of the gray-scale pixel signal D(X, Y) at the coordinates $(X_m, Y_m)$ is obtained at the terminal $T_0$ of the basic processor unit 92.

Figure 11:
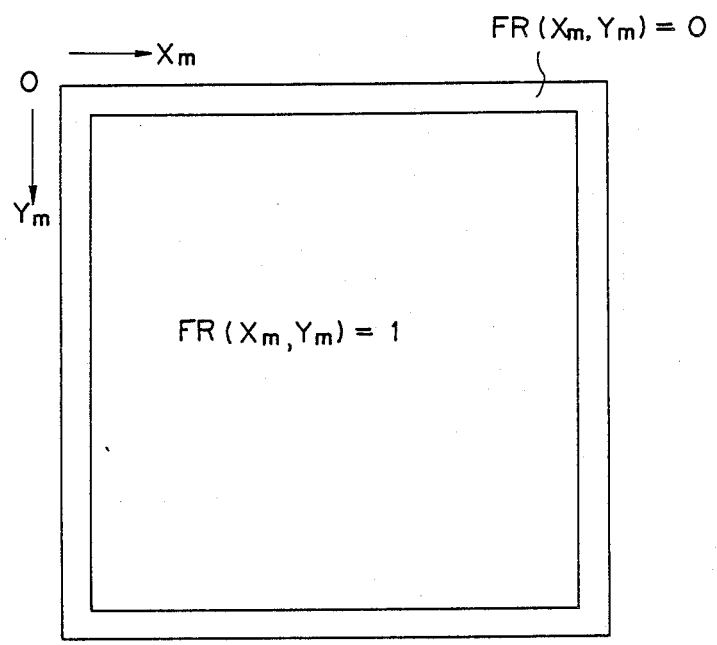
FIG. 11 is a diagram showing the frame signal FR of FIG. 9.

In the basic processor unit 93, the X-direction primary differential value $\theta_X(X, Y)$ of the basic processor unit 91 and the Y-direction primary differential value $\theta_Y(X, Y)$ of the basic processor unit 92 are supplied to the look-up table 931. In this case, the look-up table 931 stores an absolute value $\sqrt{\theta_X^2(X, Y) + \theta_Y^2(X,Y)}$ of a vector $(\theta_X(x, Y), \theta_Y(X, Y))$ in an area indicated by a combination address of $\theta_X(X, Y)$ and $\theta_Y(X, Y)$. Also, the look-up table 932 stores product values between the two inputs thereof. In this case, one of the inputs receives the frame signal $FR(X_m, Y_m)$ as illustrated in FIG. 11. Therefore, at each latch timing $LT2(X_m, Y_m)$, the edge strength signal E(X, Y) $(=\sqrt{\theta_X^2(X, Y) + \theta_Y^2(X, Y)})$ is obtained at the terminal $T_0$ of the unit 93.

Also, in the basic processor unit 94, the X-direction primary differential value $\theta_X(X, Y)$ of the basic processor unit 91 and the Y-direction primary differential value $\theta_Y(X, Y)$ of the basic processor unit 92 are supplied to the look-up table 94. In this case, the look-up table 94 stores an angle $\text{ATAN2}(\theta_Y(X, Y), \theta_Y(X, Y))$ of a vector $(\theta_X(X, Y), \theta_Y(X, Y))$ in an area indicated by a combination address of $\theta_X(X, Y)$ and $\theta_Y(X, Y)$. Note that the look-up table 942 stores product values between the two inputs thereof. Also, in this case, one of the inputs receives the frame signal $FR(X_m, Y_m)$ as illustrated in FIG. 11. Therefore, at each latch timing $LT2(X_M, Y_M)$, the angle signal $\theta(X, Y)$ $(=\text{ATAN2}(\theta_X(X, Y), \theta_Y(X, Y)))$ is obtained at the terminal $T_0$ of the unit 94.

Note that the frame signal FR as shown in FIG. 11 can remove noise due to the operation of the processor units from an area indicated by $FR(X_m, Y_m)=0$.

Figures 12, 13A, 13B:
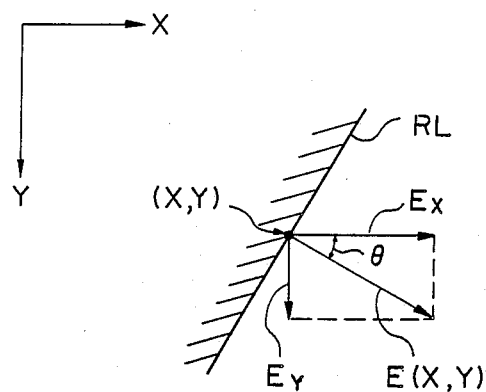
FIG. 12 is a diagram showing the edge strength data E(X, Y), of FIG. 9.
FIGS. 13A and 13B are diagrams showing the edge strength data E and the gradient angle data $\theta$ of pixels adjacent to a scanning pixel.

According to the image processor system of FIG. 9, the edge strength signal E(X, Y) and the gradient angle $\theta(X, Y)$ of a pixel at the coordinates (X, Y) can be obtained, and a ridge line, which is a border of bright and dark pixels as indicated by RL in FIG. 12, may be extracted from the edge strength signal E(X, Y) and the gradient angle $\theta(X, Y)$ (see: Nagao et al, "Extraction of Ridge Line in Pattern Recognition", Electronics and Communication Society Proc., vol. 55, No. 55, p.p. 1618-1627, 1972). Three main methods for extracting ridge lines are suggested.

In a first method it is determined whether or not an edge strength E of a notice pixel is larger than a threshold value $E_{th}$, and only when the edge strength E of this pixel is larger than $E_{th}$, this strength E is compared with the edge strength $E_0$, $E_2$, $E_4$, and $E_6$ of four nearest neighbors adjoined to the notice pixel, as illustrated in FIG. 13A. As a result, only if $E_0 \leq E > E_4$ (or $E_0 < E \geq E_4$) or $E_2 \leq E > E_6$ (or $E_2 < E \geq E_6$) is satisfied, the scanning pixel is determined to be on a ridge line. This is a simple and high-speed method, but erroneous ridge lines may be found or profile lines of an object may be too thick, which requires a thinning operation for the profile lines.

Figure 14:
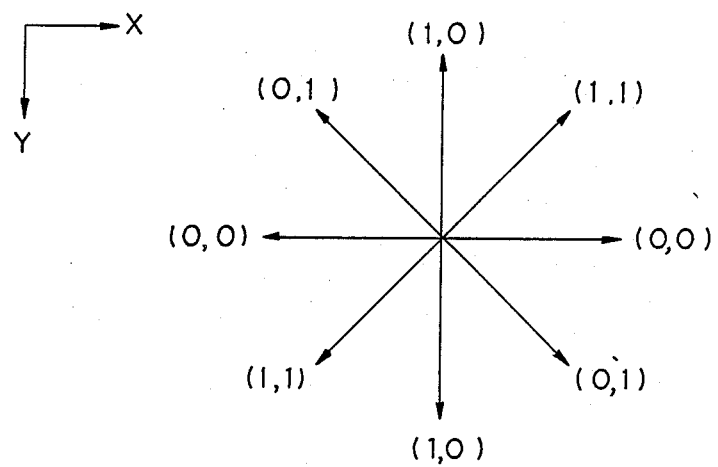
FIG. 14 is a diagram explaining two direction bits.

In a second method, the direction of a ridge line on the notice pixel is estimated from the gradient angle $\theta$ of the notice pixel, and the determination of such a ridge line is carried out by estimating the relationship between the edge strength E of the notice pixel and the edge strength Ei and Ej of pixels located adjacent to the notice pixel in a direction perpendicular to the estimated ridge line. Namely, it is determined whether or not the edge strength E of the notice pixel is larger than the threshold value $E_{th}$, and only when $E > E_{th}$, it is determined whether or not $E_i < E \geq E_j$ (or $E_i \leq E > E_j$) is satisfied, and thus only when $E > E_{th}$ and $E_i < E \geq E_j$ (or $E_i \geq E > E_j$), a ridge line is determined to be on the notice pixel. This is also a high-speed method, but in this second method, to specify the above-mentioned adjacent pixels, since the direction of the edge strength vectors in relation to 180° is indiscriminate, as illustrated in FIG. 14, it is impossible to determine whether the adjacent pixels are inside or outside to the ridge line. Theoretically, only if one pixel having a peak strength along a perpendicular direction of a ridge line is detected, a thin ridge line is detected, but in actuality, since a plurality of such pixels having a peak strength exist, the ridge lines are often thick in practice. Even in this case, an actual thick ridge line is determined to be a thin ridge line, and as a result, a ridge line is erroneously not detected, or a continuous ridge line is detected as a dotted line. This is not disadvantageous in model matching using profile lines.

In a third method, an estimation function ($f(E_i)$ is used. This is, when the edge strength E of the notice pixel is larger than the threshold value $E_{th}$, eight estimation values of eight nearest neighbor pixels (see FIGS. 13A and 13B) are calculated by $$f(E_i) = E_i^2 \cdot \cos(\theta_i - \theta) \cdot \left| \cos\left( \frac{i-1\pi}{4} - \theta \right) \right|$$

-continued ($i = 0$ to 7)

Then, one pixel having a maximum value of f(E$_i$) is selected as the next notice pixel, thus extracting a ridge line by repeating this operation. In this third method, however, the calculation is complex, the required device is large, and the processing time is long.

Figures 15A, 15B:
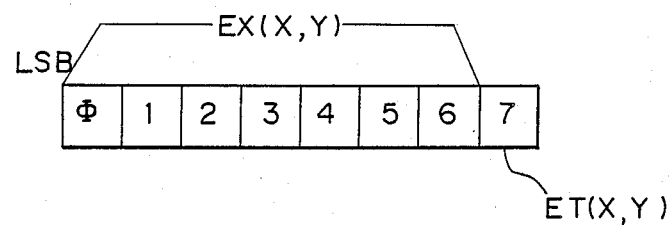
FIG. 15A shows a data format of the edge strength data E(X, Y)
FIG. 15B is a diagram of an edge strength data memory for the edge strength data.

To obtain a ridge line extracting system using the system of FIG. 9, a sign bit ET(X, T) ia added to the edge strength data EX(X, Y) as illustrated in FIG. 15A. This sign bit ET is dependent upon the edge strength data EX(X, Y). Namely, when the edge strength data EX(X, Y) is larger than a threshold value E$_{th}$, the sign bit ET thereof is made "1"; in other cases, the sign bit ET is made "0", Note that the edge strength data obtained by the system of FIG. 9 is stored in EX(X, Y) of an edge strength memory 15 as illustrated in FIG. 15B, and note that the sign bit ET is set by mapping the look-up table 931 in FIG. 9 as follows:

$$E(X, Y) = \begin{cases} EX(X, Y) = \sqrt{\theta X^2(X, Y) + \theta Y^2(X, Y)} \\ ET(X, Y) = \begin{cases} 0, EX(X, Y) < E_{th} \\ 1, E_X(X, Y) \geq E_{th} \end{cases} \end{cases}$$

where, the data format of the look-up table 931 in FIG. 9 is the same as shown in FIG. 15A and E$_X$(X, Y) represents the format from LSB to MSB-1 bits and ET(X, Y) represents the format of the MSB bit.

Note that the value ET(X, Y) can be also calculated by software with the aid of the CPU 19.

The introduction of the sign bit ET into the edge strength data E(X, Y) performs a ridge line extracting operation upon only pixels (X, Y) having the sign bit ET (="1"), thus increasing the speed of the ridge line extracting operation.

Figure 16A:
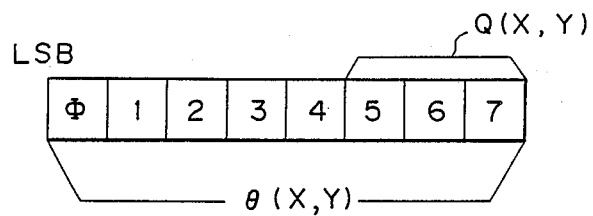
FIG. 16A shows a data format of the gradient angle data $\theta(X, Y)$.

Also, three direction bits QG are introduced into the gradient angle data $\theta$(X, Y) as illustrated in FIG. 16A, thereby discriminating whether a pixel adjacent to the notice pixel is inside or outside a border between bright and dark pictures; i.e., the direction bits QG are omnidirectional. Note, however, that the calculation of the three direction bits QG is unnecessary. If the output S1 of the look-up table 941 in FIG. 9 is in an n-bit format, the gradient angle data $\theta$(X, Y) including the three direction bits $\theta$G is given by mapping the look-up table 941 in FIG. 9 as follows:

$$\theta(X, Y) = \frac{2^n}{2\pi} (ATAN_2(\theta_X, \theta_Y) + \pi) + \frac{2^n}{16}$$

Figure 16B:
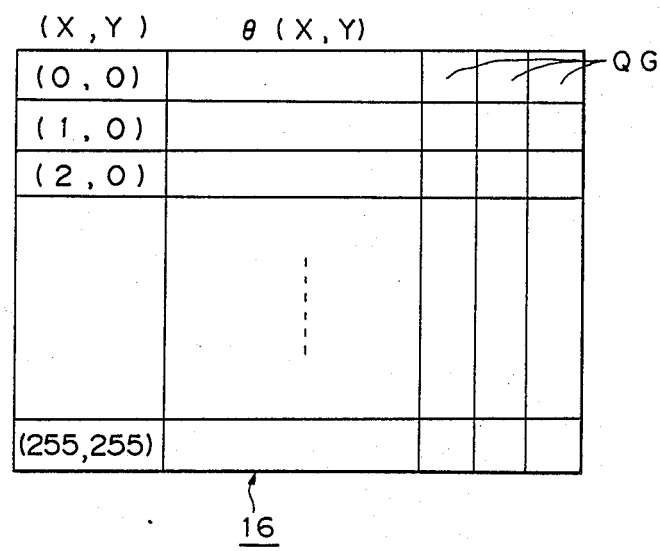
FIG. 16B is a diagram of the gradient angle data memory for the gradient angle data.
Figure 16C:
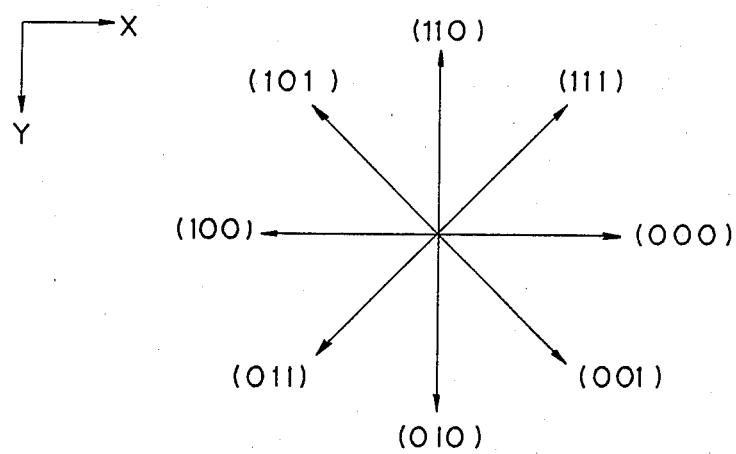
FIG. 16C is a diagram explaining three direction bits.

Since the gradient angle data $\theta$(X, Y) obtained by the system of FIG. 9 is stored in a gradient angle data memory 16 as illustrated in FIG. 16B, the upper three bits show the direction bits QG as illustrated in FIG. 16C. Thus, if it is determined that E$_i$<E$\geq$E$_j$, it is possible to fix E$_i$ to the edge strength data of a pixel outside the ridge line, and to fix E$_j$ to the edge strength data of a pixel inside the ridge line, which contributes to the obtaining of a continuous and thin ridge line.

Figure 17A:
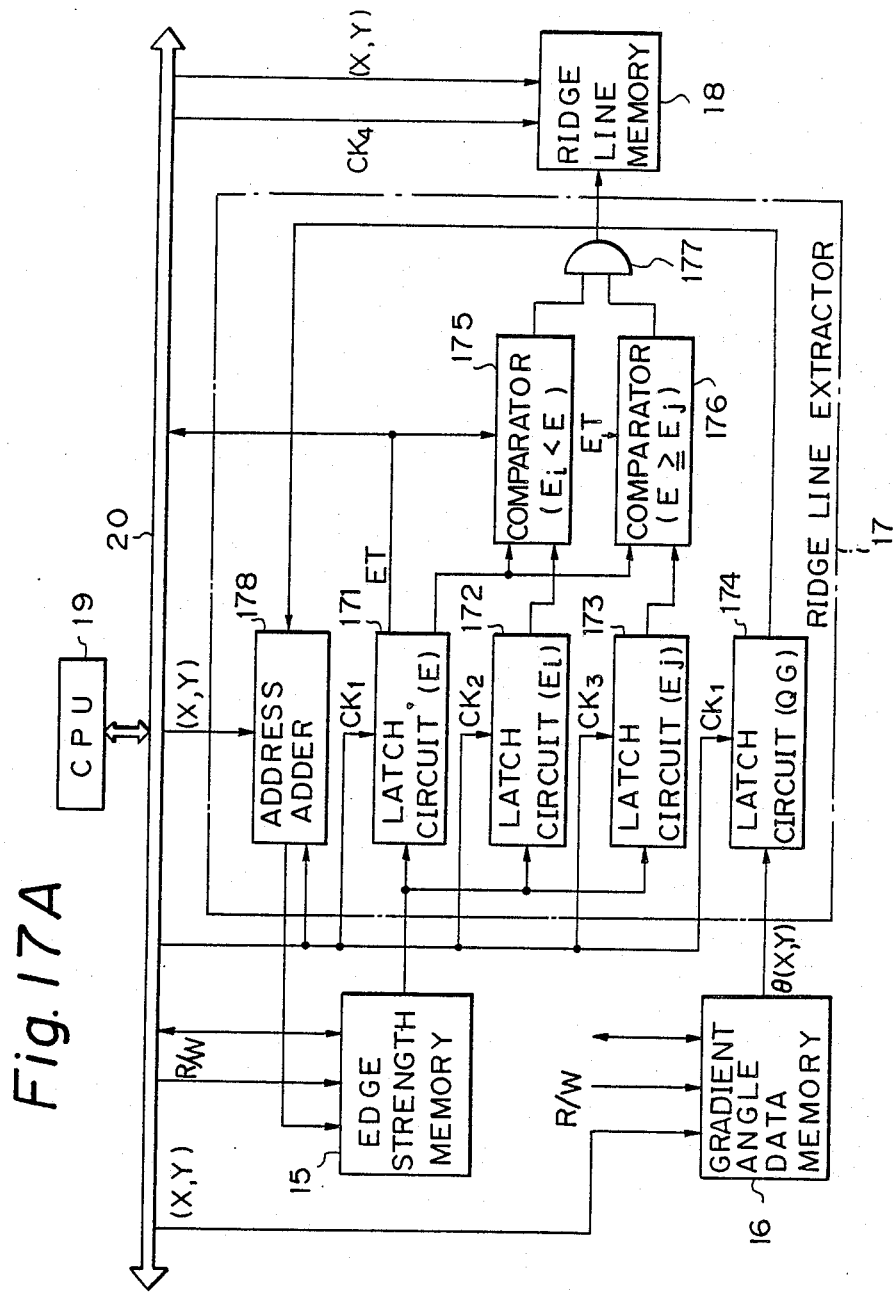
FIG. 17A is a circuit diagram of the ridge line extractor according to the present invention.

In FIG. 17A, the system of FIG. 9 is applied to a ridge line extracting system. A ridge line extractor 17 comprises latch circuits 171, 172, and 173 for storing edge strength data E, E$_i$, and E$_j$a, latch circuit 174 for storing three direction bits QG, two comparators 175 and 176, an AND circuit 177 and an address adder 178.

The latch circuits 171, 172, and 173 store edge strength data E, E$_i$ and E$_j$ when receiving clock signals CK$_1$, CK$_2$, and CK$_3$, respectively, and the latch circuit 174 stores three direction bits QG when receiving the clock signal CK$_1$. The comparator 175 compares the output E of the latch circuit 171 with the output E$_i$ of the latch circuit 172 when receiving a sign bit signal ET (="1") from the latch circuit 171, and the comparator 176 compares the output E of the latch circuit 171 with the output E$_j$ of the latch circuit 173 when receiving the sign bit signal ET (="1"). The address adder 178 passes a pixel address (X, Y) from a CPU 19 via a system bus 20 to the edge strength data memory 15 when the sign bit signal ET is "0", and adds an amount ($\theta_X$, $\theta_Y$) to the pixel address (X, Y) from the CPU 19 when the sign bit signal ET is "1". This amount ($\Delta$X, $\Delta$Y) is dependent upon the direction bits QG of the latch circuit 174. In this case, this amount ($\Delta$X, $\Delta$Y) is as follows:

| QG | ($\Delta$X, $\Delta$Y) for E$_i$ | for E$_j$ |
|---|---|---|
| (000) | (1, 0) | (−1, 0) |
| (001) | (1, −1) | (−1, 1) |
| (010) | (0, −1) | (0, 1) |
| (011) | (−1, −1) | (1, 1) |
| (100) | (−1, 0) | (1, 0) |
| (101) | (−1, 1) | (1, −1) |
| (110) | (0, 1) | (0, −1) |
| (111) | (1, 1) | (−1, −1) |

Figure 18:
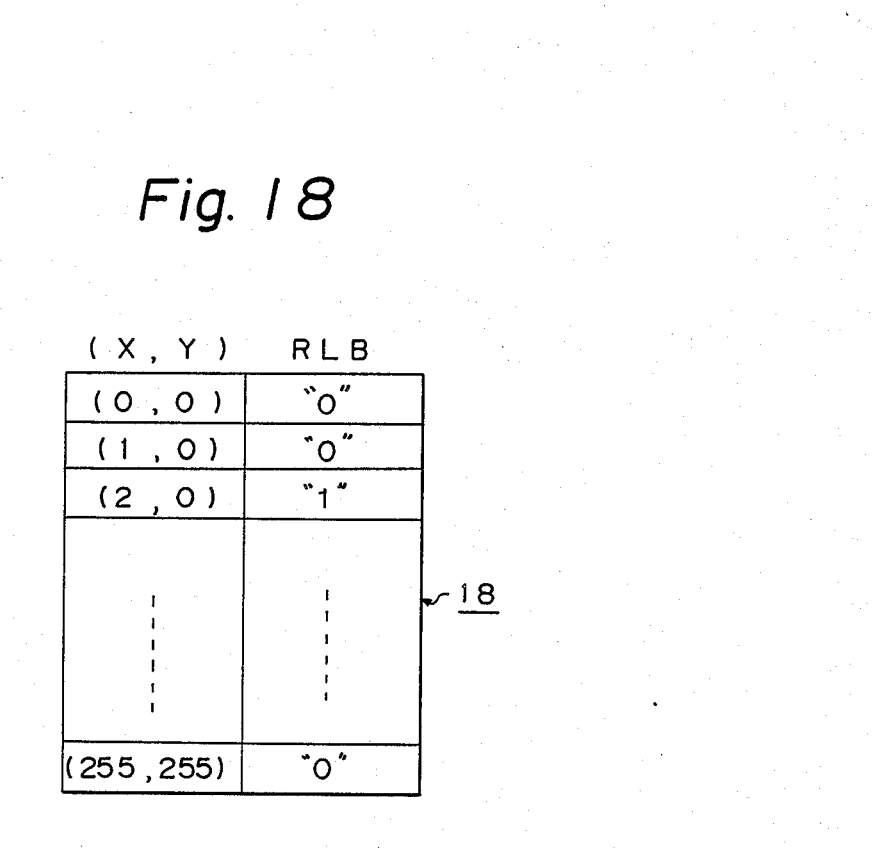

Also, the ridge line memory 18 stores a pixel address (X, Y), when E$_i$<E and E$\geq$E$_j$ are satisfied. As illustrated in FIG. 18, in the ridge line memory 18, a ridge line bit RLB is stored in an area indicated by an address (X, Y), and therefore, when the CPU 19 generates a clock signal CK$_4$, the ridge line bit RLB dependent upon the output of the AND circuit 177 is written to the corresponding area of the ridge line memory 18.

Note that a prestage circuit as shown in FIG. 17B instead of the circuit of FIG. 9 can be used. That is, reference numeral 171' designates a video camera for converting a scene of an object into an analog electrical signal which is supplied to an A/D converter 172'. This A/D converter 172' performs an A/D conversion upon the analog electrical signal from the video camera 171', and as a result, a gray-scale digital signal D(X, Y) is generated therefrom and is temporarily stored in a gray-scale storing memory 173'. An X-direction primary differential calculating circuit 174' comprises a 3×3 Sobel operator for an X-direction, and accordingly, the circuit 174' calculates an X-direction primary differential value $\theta_X$of a pixel (X, Y). Similarly, a Y-direction primary differential calculating circuit 175' comprises a 3×3 Sobel operator for a Y-direction, and accordingly 175' calculates a Y-direction primary differential value $\theta_Y$of a pixel (X, Y). Then, an edge strength calculating circuit 176' calculates an edge strength E(X, Y) by $$E(X, Y) = \sqrt{\theta_X^2 + \theta_Y^2}.$$

Also, a gradient angle calculating circuit 177' calculates a gradient angle $\theta$(X, Y) by $$\theta(X, Y) = ATAN_2(\theta_X(X, Y), \theta_Y(X, Y)).$$

Thus, the outputs of the edge strength calculating circuit 176' and the gradient angle calculating circuit 177' are supplied to the edge strength data memory 15 and the gradient angle data memory 16, respectively. Note that each of the primary differential calculating circuits 174' and 175' can be also comprised of a digital signal processor (DSP) and other special large scale integrated circuits for a convolution calculation. Also, the operation of the primary differential calculating circuits can also be carried out by software with the aid of the CPU 19.

The operation of the circuit of FIG. 17A will be explained with reference to FIG. 19. The CPU 19 generates clock signal $CK_1$ and a pixel address (X, Y). In this case, the address adder 178 passes the pixel address (X, Y) therethrough, so that the edge strength data E(X, Y) of the pixel address (X, Y) is stored in the latch circuit 171 by the rising edge of the clock signal $CK_1$. Simultaneously, the three direction bits QG of the pixel address (X, Y) are stored in the latch circuit 174 by the rising edge of the clock signal $CK_1$. The generation of the clock signal $CK_1$ and the renewal of the pixel address (X, Y) causes this state to continue until a sign bit ET (="1") is detected from the edge strength data E(X, Y), i.e., until the latch circuit 171 generates a sign bit signal ET (="1"). In this state the comparators 175 and 176 are not operated, and accordingly, the AND circuit 177 generates a low level signal (="0"). At a time $t_1$, at which the latch circuit 171 generates a sign bit signal ET (="1"), the CPU 19 stops the generation of the clock signal $CK_1$ and the renewal of the pixel address (X, Y), and thereafter, the CPU 19 generates clock signals $CK_2$, $CK_3$, and $CK_4$ in this sequence. Therefore, from the time $t_1$ to the time $t_2$, the address adder 178 adds ($\theta_X$, $\theta_Y$) for $E_i$ dependent upon the direction bits QG to the pixel address (X, Y), and accordingly, transmits an address (X+$\Delta$X, Y+$\Delta$Y) to the edge strength data memory 15. As a result, at a time $t_2$, the edge strength data $E_i$ is stored in the latch circuit 172 by the rising edge of the clock signal $CK_2$. Also, from the time $t_2$ to the time $t_3$, the address adder 178 adds ($\Delta$X, $\Delta$Y) for $E_j$ dependent upon the direction bits QG to the pixel address (X, Y), and accordingly, transmits an address (X+$\Delta$X, Y+$\Delta$Y) to the edge strength data memory 15. As a result, at a time $t_3$, the edge strength data $E_j$ is stored in the latch circuit 173 by the rising edge of the clock signal $CK_3$.

The comparators 175 and 176 are operated by the sign bit signal ET (="1"); i.e., the comparator 175 generates a high level signal only when $E > E_i$, and the comparator 176 generates a high level signal only when $E \geq E_j$. Therefore, only the edge strength data E of the pixel address (X, Y) is the largest, among the three edge strength data E, $E_i$ and $E_j$, and the AND circuit 177 generates a high level signal (="1"). As a result, at a time $t_4$, the clock signal $CK_4$ rises, and "1" or "0" is written into an area of the ridge line memory 18 indicated by an address (X, Y).

Figure 19:
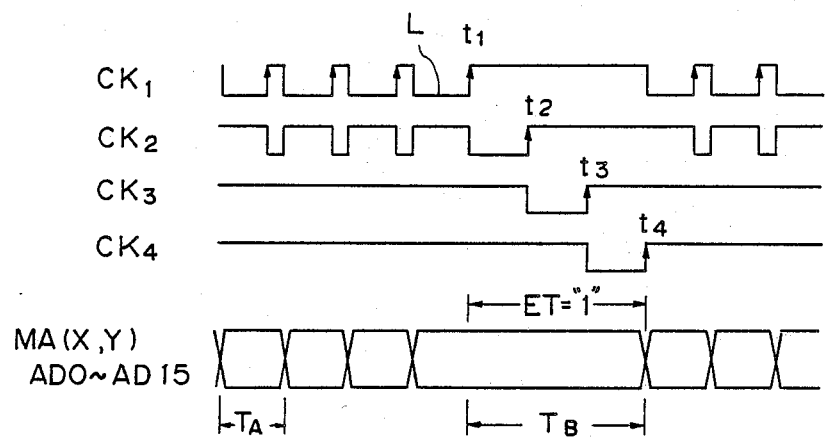
FIG. 19 is a timing diagram showing the operation of the circuit of FIG. 17A.

As is clear from FIG. 19, since an operation time period $T_A$ for a pixel having a sign bit signal ET (="0") is very short, and an operation time period $T_B$ for only a pixel having a sign bit signal ET (="1") is relatively long, the total operation time period for the entire image data can be reduced.

The operation of the ridge line extractor 17 of FIG. 17A also can be carried out by the CPU 19 with a routine as illustrated in FIG. 20. At step 2001, counter values k and l are cleared, then, at step 2002, edge strength data $E(X_k, Y_l)$ is read from the edge strength data memory 15, and at step 2003, it is determined whether or not the sign bit ET thereof is "1". Only if ET="1", the control proceeds to step 2004. Alternatively, the control proceeds to step 2016.

At step 2004, E is made $E(X_k, Y_l)$, and then, at step 2005, three direction bits $QG(X_k, Y_l)$ of gradient angle data $\theta(X_k, Y_l)$ are read from the gradient angle data memory 16, and at step 2006, an amount ($\Delta$X, $\Delta$Y) for $E_i$ is read from the memory (not shown) dependent upon the direction bits QG. Note that the relationship therebetween has been already explained. At step 2007, an address (X, Y) for the edge strength $E_i$ is calculated by $$(X, Y) \leftarrow (X_k, Y_l) + (\Delta X, \Delta Y)$$

i.e., $$X \leftarrow X_k + \Delta X$$

$$Y \leftarrow Y_l + \Delta Y.$$

Then, at step 2008, edge strength data E(X, Y) of the address (X, Y) is read from the edge strength data memory 15, and $E_i$ is made from E(X, Y). Then, at step 2009, it is determined whether or not $E > E_i$ is satisfied. If $E \leq E_i$, the control proceeds to step 2010, at which "0" is written as a ridge line bit RLB to an area of the ridge line memory 18 indicated by the address (X, Y). Alternatively, the control proceeds to step 2011.

At step 2011, an amount ($\Delta$X, $\Delta$Y) for $E_j$ is read from the memory (not shown) dependent upon the direction bits QG. Note that the relationship therebetween also has been already explained. At step 2012, an address (X, Y) for the edge strength $E_j$ is calculated by $$(X, Y) \leftarrow (X_k, Y_l) + (\Delta X, \Delta Y)$$

i.e., $$X \leftarrow X_k + \Delta X$$

$$Y \leftarrow Y_l + \Delta Y.$$

Then, at step 2013, edge strength data E(X, Y) of the address (X, Y) is read from the edge strength data memory 15, and $E_j$ is caused to be E(X, Y). Then, at step 2014, it is determined whether or not $E \geq E_j$ is satisfied. If $E < E_j$, the control proceeds to step 2010, at which "0" is written as a ridge line bit RLB to an area of the ridge line memory 18 indicated by the address (X, Y). Alternatively, the control proceeds to step 2015. Namely, only when $E_i < E \geq E_j$, the control proceeds to step 2015, at which "1" is written as a ridge line bit RLB to an area of the ridge line memory 18 indicated by the address (X, Y).

At step 2016, the counter value k is counted up by +1, and at step 2017, it is determined whether or not k>255. If k>255, the control proceeds to step 2018. Similarly, at step 2018, the counter value l is counted up by +1, and at step 2019, it is determined whether or not l>255. When the determination at step 2017 or 2019 is negative, the control proceeds (via step 2020) to step 2002, thus repeating the above-mentioned steps. Alternatively, the control proceeds to step 2021, and this routine is completed.

Thus, when only addresses having the ridge line bit RLB (="1") are read from the ridge line memory 18, a profile line of a gray-scale image can be extracted.

As explained above, ridge line data is stored in the ridge line memory 18 of FIG. 18. In this case, this ridge line data is discriminated by the ridge line bit RLB thereof. Therefore, when ridge line bits (RLB) allocated addresses (X, Y) are scanned, a profile line is obtained. Even in this case, the amount of ridge line data is too large, and to reduce the amount of data, the following polygon approximation methods have been suggested:

(1) Straight lines approximate to a ridge line are obtained by using the method of least squares, to extract sides from the ridge line.

(2) Segment patterns having various slopes are compared with a ridge line, to extract sides from the ridge line.

(3) When the change of the tangent of a ridge line is larger than a threshold value, i.e., when a definite change occurs in the curvature of the ridge line, vertices are extracted from the ridge line.

(4) When the change of the gradient angle of a vector of a gray-scale pixel on ridge line is larger than a threshold value, the address of such a gray-scale pixel is treated as a vertex.

Method (1) requires a large amount of processing time, but method (2), in which the determination of segment patterns is carried out by the off-line system, is not disadvantageous in real-time image processor systems.

In method (3), when the tangent of a ridge line is calculated locally for each pixel on the ridge line, the resolution is coarse and it is difficult to obtain an accurate curvature. Conversely, when the tangent of a ridge line is calculated roughly for some pixels on the ridge line, small changes of the tangent are smoothed, so that it is difficult to accurately extract vertexes from the ridge line.

Figure 21A:
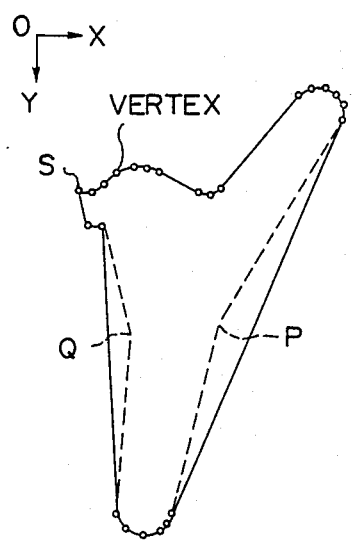
FIGS. 21A and 21B are diagrams showing examples of ridge line data.
Figure 21B:
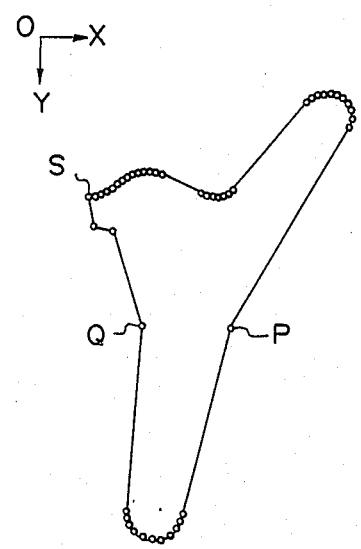

In method (4), since vertexes are detected by determining whether or not the change of the angle (gradient angle) of a gradient vector of a gray-scale pixel is larger than a threshold value, important vertexes which, however, have a small change of gradient angle cannot be detected. For example, if a ridge line is changed as illustrated in FIG. 21A, the gradient angle $\theta$ of pixels on the ridge line is changed as illustrated in FIG. 22A, and accordingly, the change of the gradient angle, i.e., $d\theta/dl$ is changed as illustrated in FIG. 22B. Since $d\theta/dl$ at points P and Q is smaller than the threshold value $\Delta\theta$, such points cannot be detected as vertexes, although these points are important. Conversely, if the threshold value $\Delta\theta$ is reduced, a large number of unnecessary vertexes including the important points P and Q are detected as illustrated in FIG. 21B, which is disadvantageous from the viewpoint of a reduction of data.

Figure 23:
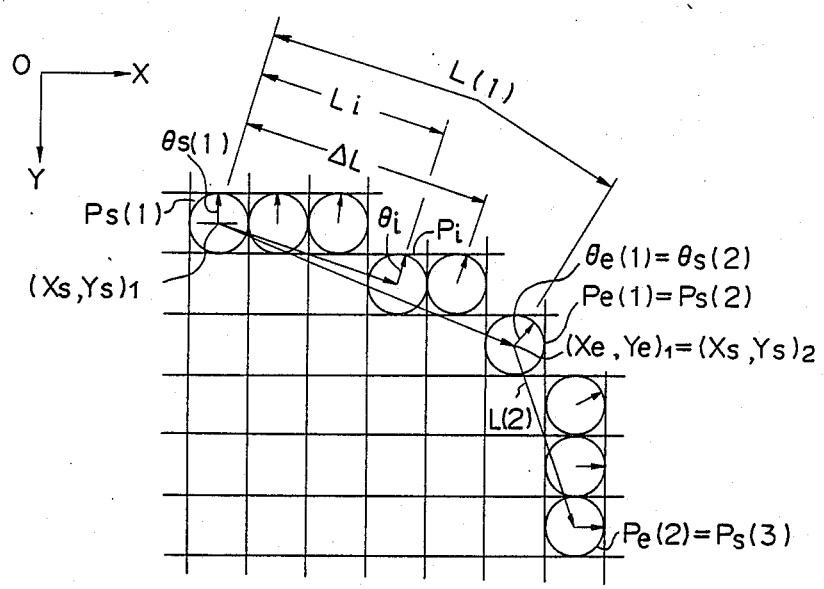
FIG. 23 is a diagram explaining the polygon segmentation (approximation) according to the present invention.

The polygon approximation method according to the present invention will be explained with reference to FIG. 23, which illustrates the content of the ridge line memory 18 of FIG. 18. Namely, addresses having ridge line bits RLB (="1") are rounded, to form a ridge line. Note, $L_i$ is a segment length from a start pixel $P_s$ to a notice pixel $P_i$, $\Delta L$ is a threshold value of the segment length for the extraction of segments, $\theta_i$ is a gradient angle of the pixel $P_i$, $\Delta\theta$ is a threshold value of the gradient angle for the extraction of segments, $(X_s, Y_s)$ are start coordinates of a segment, and $(X_e, Y_e)$ are end coordinates of a segment.

According to the present invention, when the following two conditions are satisfied, $L_i \geq \Delta L$ and $|\theta_i - \theta_s| \geq \Delta\theta$, then the coordinates $(X_i, Y_i)$ of the notice pixel $P_i$ becomes the end coordinates $(X_e, Y_e)$ of a segment, and simultaneously, becomes the start coordinates $(X_s, Y_s)$ of a next segment. For example, in FIG. 23, the start coordinates $(X_s, Y_s)_1$ and the end coordinates $(X_e, Y_e)_1$ of the first segment are defined by the addresses of the pixel $P_s(1)$ and the pixel $P_e(1)$, and the start coordinates $(X_s, Y_s)_2$ and the end coordinates $(X_e, Y_e)_2$ of the second segment are defined by the addresses of the pixel $P_s(2)$ and the pixel $P_e(2)$. In this case, the pixel $P_e(1)$ is the same as the pixel $P_s(2)$.

Note that the threshold values $\Delta L$ and $\Delta\theta$ can be changed as occasion demands.

Figure 24:
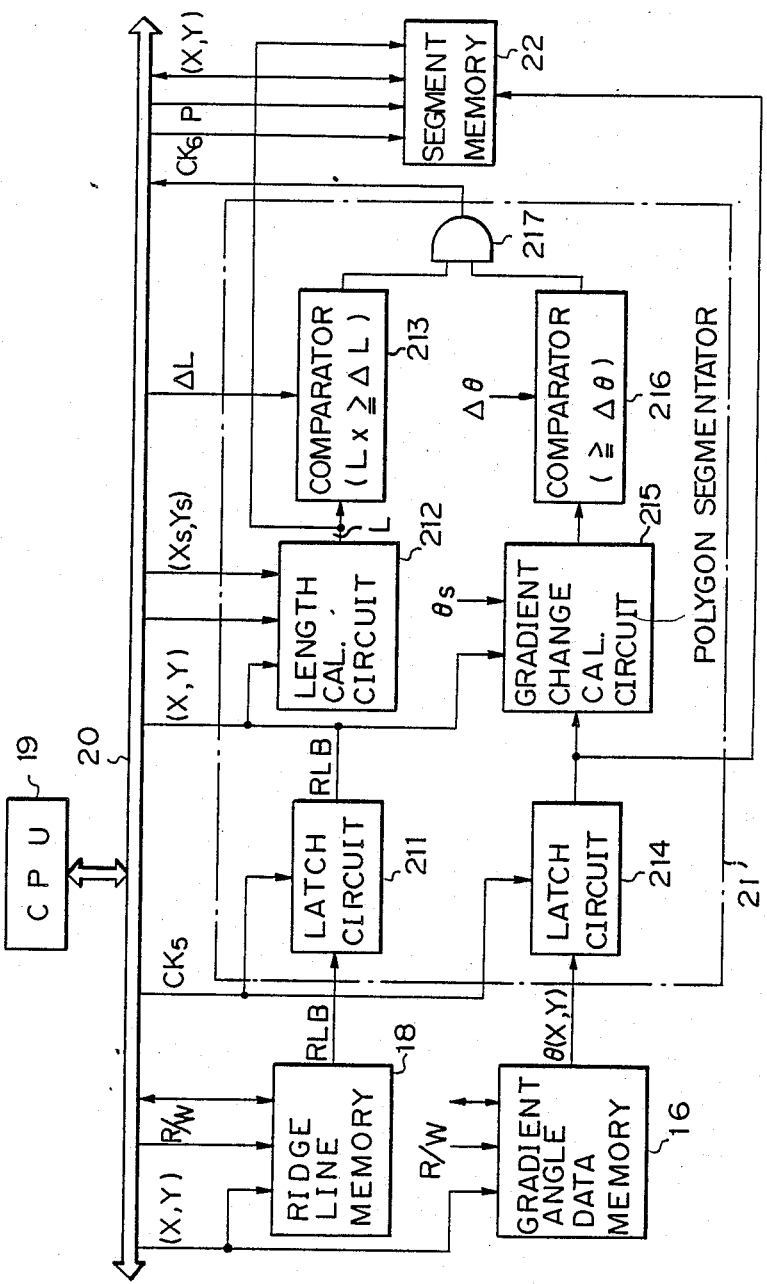
FIG. 24 is a circuit diagram of the polygon segmentation according to the present invention.

In FIG. 24, which illustrates a polygon segmentator according to the present invention, a polygon segmentator 21 comprises a latch circuit 211 for storing a ridge line bit RLB of a scanning coordinates (X, Y) on a ridge line, a length calculation circuit 212 for calculating a length $L_i$ between a start coordinates $(X_s, Y_s)$ and scanning coordinates (X, Y), and a comparator 213 for comparing the output $L_i$ of the length calculation circuit 212 with the threshold value $\Delta L$. Also, the polygon segmentator 21 comprises a latch circuit 214 for storing a gradient angle $\theta_i$ of an address (X, Y), a gradient change calculation circuit 215 for calculating a change of the gradient angle $\theta_s$ of the start coordinates $(X_s, Y_s)$ and the gradient angle $\theta$ of the notice coordinates (X, Y), and a comparator 216 for comparing the output of the gradient change calculation circuit 215 with the threshold value $\Delta\theta$. The outputs of the comparators 213 and 216 are connected to an AND circuit 217, and the latch circuits 211 and 214 are operated by a clock signal $CK_5$. Also, the length calculation circuit 212 and the gradient change circuit 215 are operated, only when the ridge line bit RLB of the latch circuit 211 is "1". Only when the two comparators 213 and 216 generate a high level signal ($L_i \geq \Delta L$ and $|\theta - \theta_s| \geq \Delta\theta$), the AND circuit 217 generates a high level signal, thereby performing a write operation upon a segment memory 22.

Figure 25:
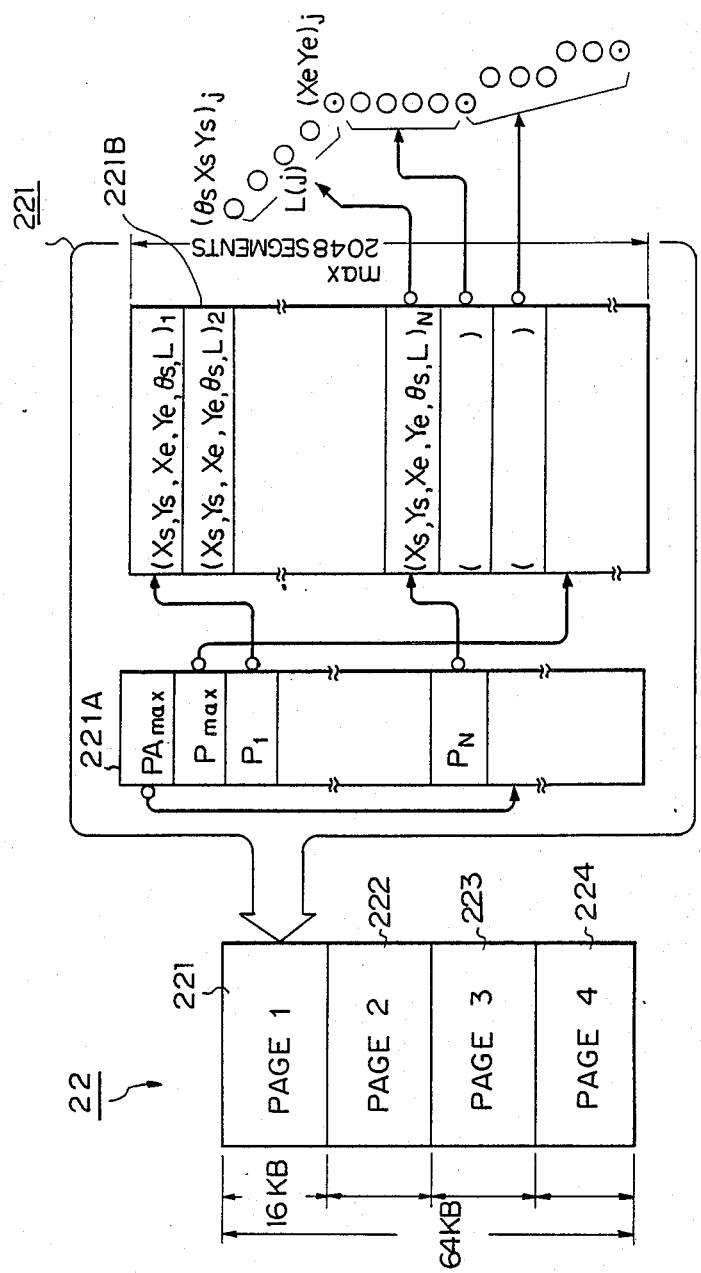
FIG. 25 is a diagram of the segment memory of FIG. 24.

As illustrated in FIG. 25, the segment memory 22 comprises four 16-Kbyte RAMs 221, 222, 223, and 224 for storing profile information of four pages (i.e., four images). Each of the pages, such as 221, is composed of a pointer portion 221A and a list portion 221B for storing a maximum of 2048 segments. In the pointer portion 221A, PAmax indicates a pointer address next to the maximum pointer $P_N$, Pmax indicates an address next to the maximum address of the list portion 221B.

Figure 26:
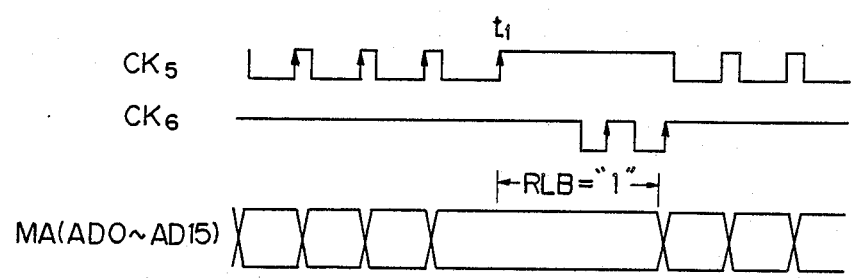
FIG. 26 is a timing diagram showing the operation of the circuit of FIG. 24.

The operation of the circuit of FIG. 24 will be explained with reference to FIG. 26. The CPU 19 generates a clock signal $CK_5$ and a scanning pixel address (X, Y), and as a result, the latch circuit 211 stores a ridge line bit RLB of the pixel address (X, Y) by the rising edge of the clock signal $CK_5$, and further, the latch circuit 214 stores a gradient angle data $\theta(X, Y)$ of the pixel address (X, Y) by the rising edge of the clock signal $CK_5$. The generation of the clock signal $CK_5$ and the renewal of the pixel address (X, Y), causes this state to continue until a ridge line bit RLB (="1") is detected, i.e., until the latch circuit 211 generates the ridge line bit signal RLB (="1"). In this state, the circuits 212 and 215 and the comparators 213 and 216 are not operated, and accordingly, the AND circuit 217 generates a low level signal (="0"). At a time $t_1$ at which the latch circuit 211 generates a ridge line bit signal RLB (="1"), the CPU 19 stops the generation of the clock signal $CK_5$ and the renewal of the pixel address (X, Y), and thereafter, the CPU 19 transmits the pixel address (X, Y) and the start coordinates (address) $(X_s, Y_s)$ of the scanning segment stored in the segment memory 22 indicated by the pointer P to the length calculation circuit 212. As a result, the length calculation circuit 212 calculates a length L by $$L \leftarrow \sqrt{(X - X_s)^2 + (Y - Y_s)^2} \ .$$

Also, the CPU 19 transmits a threshold value $\Delta L$ to the comparator 213, and thus the comparator 213 compares the length L with the threshold value $\theta L$. As a result, when $L \geq \Delta L$, the comparator 213 generates a high level signal. Simultaneously, the CPU 19 transmits the gradient angle data $\theta(X, Y)$ of the pixel address $(X, Y)$ and the start gradient angle $\theta_s$ of the scanning segment stored in the segment memory 22 indicated by the pointer P to the gradient change calculation circuit 215, and as a result, the gradient change calculation circuit 215 calculates a gradient change $|\theta - \theta_s|$. Also, the CPU 19 transmits a threshold value $\Delta\theta$ to the comparator 216, and thus the comparator 216 compares the value $|\theta - \theta_s|$ with the threshold value $\Delta\theta$. As a result, when $|\theta - \theta_s| \geq \Delta\theta$, the comparator 216 generates a high level. Therefore, only when $L \geq \Delta L$ and $|\theta - \theta_s| \geq \Delta\theta$, the AND circuit 217 transmits a high level signal to the CPU 19 via the system bus 20.

Upon receipt of a high level signal from the AND circuit 217, the CPU 19 transmits a clock signal $CK_6$ to the segment memory 22, and accordingly, the pixel address $(X, Y)$ is written as the end coordinates $(X_e, Y_e)$ of the scanning segment into the segment memory 22. Then, the CPU 19 increases the pointer P by +1, and again transmits a clock signal $CK_6$ to the segment memory 22, and accordingly, the pixel address $(X, Y)$ is written as the start coordinates $(X_s, Y_s)$ of the next segment to the segment memory 22. In this case, the gradient angle $\theta(X, Y)$ and the length L are also written to the segment memory 22 indicated by the pointer P.

Note that the calculation of the values of PAmax and Pmax of the pointer portion 221A is omitted from the above-mentioned description, for simplicity.

Figure 27:
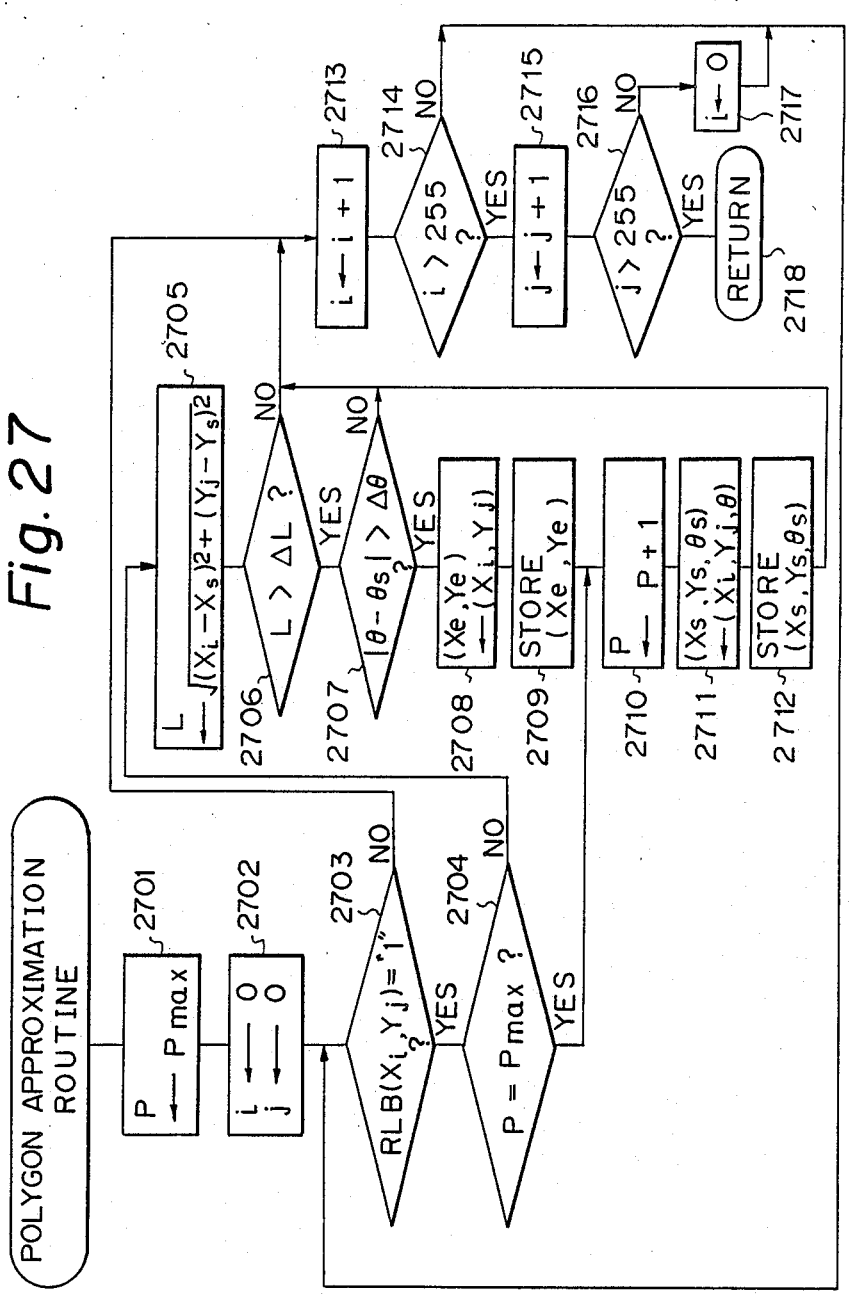
FIG. 27 is a flow chart of the polygon segmentation according to the present invention.

The operation of the polygon segmentator 21 of FIG. 24 also can be carried out by the CPU 19, with the routine illustrated in FIG. 27. At step 2701, a pointer value P is made Pmax, to store 1 start coordinates $(X_s, Y_s)$ of a first segment, and at step 2702, counter values i and j are cleared. At step 2703, a ridge line bit RLB of an address $(X_i, Y_j)$ is read from the ridge line memory 18, and it is determined whether or not the ridge line bit RLB is "1", i.e., the pixel address $(X_i, Y_j)$ is on a ridge line. If RLB="1", the control proceeds to step 2704. Alternatively, the control proceeds to step 2713.

At step 2704, it is determined whether or not the pointer value P is Pmax. If P=Pmax, the control proceeds to step 2710, at which the pointer value P is increased. In this case, the pointer value P is made $P_1$ (See FIG. 25). Then, at step 2711, $(X_s, Y_s, \theta)$ is made $(X_i, Y_j, \theta)$, and then, at step 2712, the data $(X_s, Y_s, \theta_s)$ is stored in the first segment area of the segment memory 22 indicated by the pointer value $P_1$.

At step 2713, the counter value i is counted up by +1, and at step 2714, it is determined whether or not i>255. If i>255, the control proceeds to step 2715. Similarly, at step 2715, the counter value j is counted up by +1, and at step 2716, it is determined whether or not j>255. When the determination at step 2714 is negative, the control returns to step 2703. Also, when the determination at step 2716 is negative, the control proceeds to step 2717 which clears the counter value i, and then the control proceeds to step 2717. Further, when the determination at step 2716 is affirmative, the control proceeds to step 2718, and this routine is completed.

At step 2705, a length L between the scanning address $(X_i, Y_j)$ and the start address $(X_s, Y_s)$ is calculated by $$L \leftarrow \sqrt{(X_i - X_s)^2 + (Y_j - Y_s)^2} \ .$$

Then, at step 2706, it is determined whether or not $L \geq \Delta L$ is satisfied. If $L \geq \Delta L$, the control proceeds to step 2707. Alternatively, the control proceeds to step 2713.

At step 2707, it is determined whether or not $|\theta - \theta_s| \geq \Delta\theta$ is satisfied. In this case, the value $|\theta - \theta_s|$ shows a change between the gradient angle $\theta_s$ of the start coordinates $(X_s, Y_s)$ and the gradient angle $\theta$ of the scanning coordinates $(X_i, Y_j)$. If $|\theta - \theta_s| \geq \Delta\theta$, the control proceeds to steps 2708; i.e., only when $L \geq \Delta L$ and $|\theta - \theta_s| \geq \Delta\theta$, does the control proceed to step 2708 through 2712.

At step 2708, the end coordinates $(X_e, Y_e)$ are made $(X_i, Y_j)$, and at step 2709, the data $(X_e, Y_e)$ is stored in the scanning segment of the segment memory 22 indicated by the pointer value P. Further, at steps 2710, 2711, and 2712, as already explained, the data $(X_s, Y_s, \theta_s) = (X_i, Y_j, \theta)$ is written to the next segment area of the segment memory 221, since the pointer value P is increased by +1.

Accordingly, the ridge line data stored in the ridge memory 18 is converted into the segment data stored in the segment memory 22 by the circuit of FIG. 24 or by the routine of FIG. 27.

Note that, when the ridge line memory 18 is scanned for the polygon approximation, a sign bit can be written as a scanned address to the ridge line memory 18, thereby preventing a double scanning for the polygon approximation.

Figure 28A:
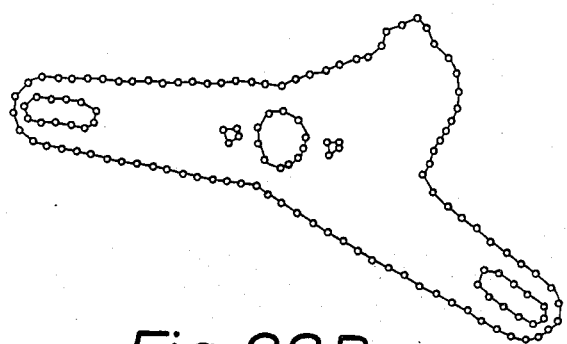
FIGS. 28A, 28B, and 28C are diagrams of examples of polygon segments obtained by the present invention.
Figure 28B:
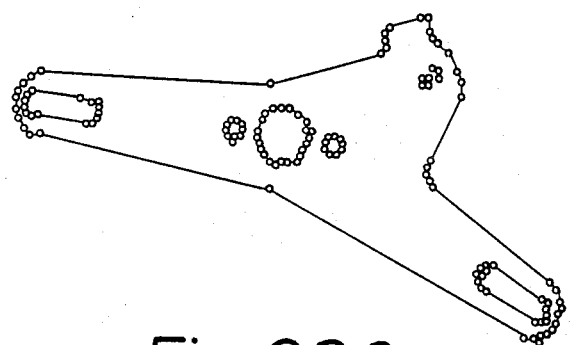
Figure 28C:
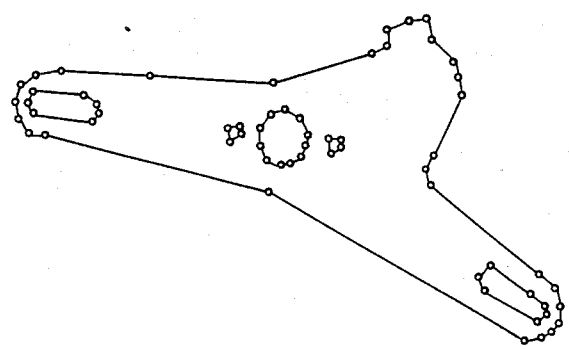

As explained above, the threshold values $\Delta L$ and $\Delta\theta$ can be changed. For example, if aL denotes five pixels and $\Delta\theta$ is 0°, polygons as illustrated in FIG. 28A are obtained. Also, if $\Delta L$ denotes 0 pixel and $\Delta\theta$ is 5°, polygons as illustrated in FIG. 28B are obtained. Further, if $\Delta L$ denotes 5 pixels and $\Delta\theta$ is 5°, polygons as illustrated in FIG. 28C are obtained. Note that the numbers of segments in FIG. 28A, 28B, and 28C are 130, 150, and 60, respectively. Particularly, in FIG. 28C, all the important vertexes are detected and the number of segments is minimized, and thus a reasonable polygon approximation is obtained.

Figure 29:
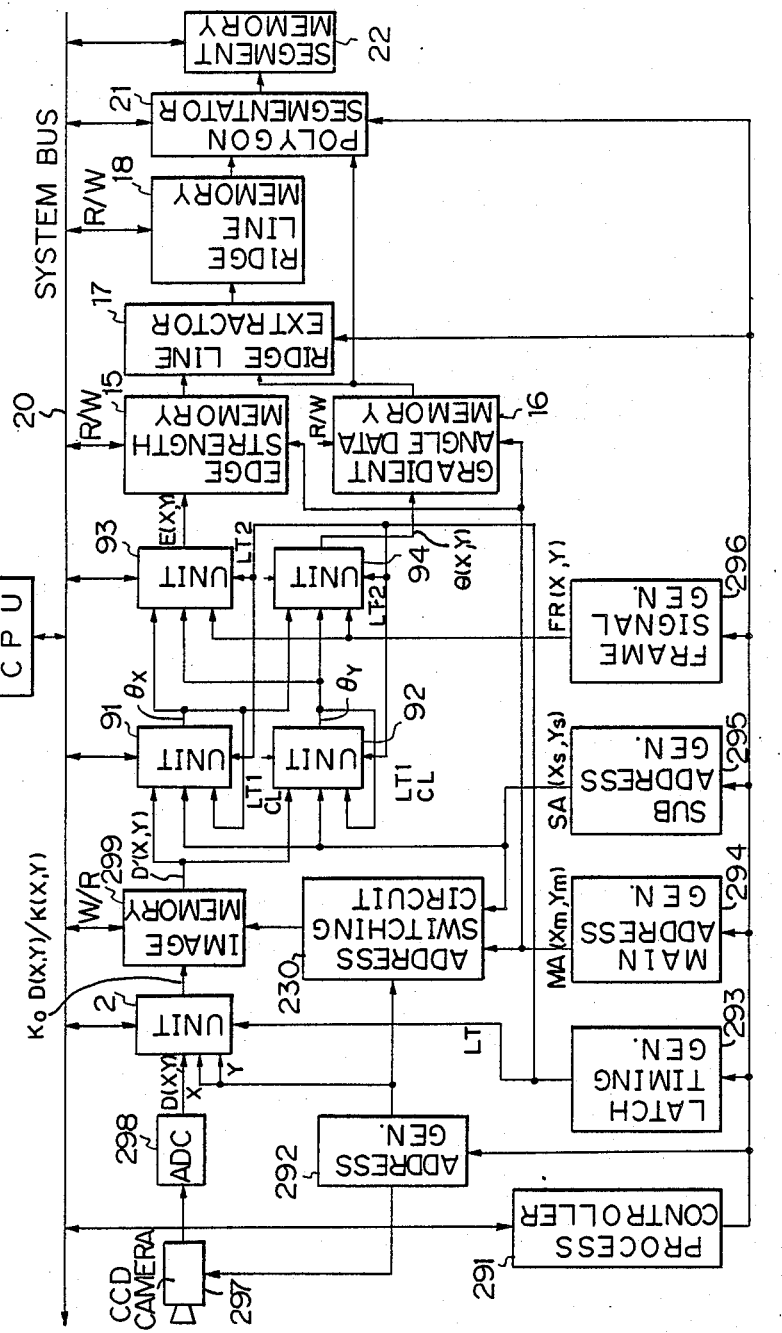
FIG. 29 is a circuit diagram of the entire image processing system according to the present invention.

FIG. 29 is a block diagram illustrating the entire image processing system. In FIG. 29, the basic processor unit 2 of FIG. 6, the basic processor units 91, 92, 93, and 94 of FIG. 9, the edge strength data memory 15 of FIG. 15B, the gradient angle data memory 16 of FIG. 16B, the CPU 19 of FIG. 17, the system bus 20 of FIG. 17, the ridge line extractor 17 of FIG. 17, the polygon segmentator 21 of FIG. 24, and the segment memory 22 of FIG. 24 are illustrated. The other elements will be explained below. Reference 291 designates a process controller which controls an address signal generator 292, a latch timing generator 293 for controlling the basic processor units 2, 91, 92, 93, and 94, a main scanning address generator 294 for generating a main address $MA(X_m, Y_m)$, a sub scanning address generator 295 for generating a sub scanning address SA($X_s$, $Y_s$), a frame signal generator 296, the ridge line extractor 17, and the polygon segmentator 21. Note that various signals are supplied from the CPU 19 via the system bus 20 to the ridge line extractor 17 of FIG. 17, and to the polygon segmentator 21 of FIG. 24, but some thereof are actually supplied from the process controller 291. The address signal generator 292 generates a video rate address which is used for operating a CCD camera 297, so that an analog video signal is supplied to an analog/digital (A/D) converter 298, which generates a gray-scale digital signal D(X, Y). An image memory 299 stores the output $K_0 \cdot D(X, Y)/K(X, Y)$ of the basic processor unit 2. An address switching circuit 230 passes therethrough the address signal from the address signal generator 292 or a combination address of the main scanning address MA and the sub scanning address SA.

Figure 30:
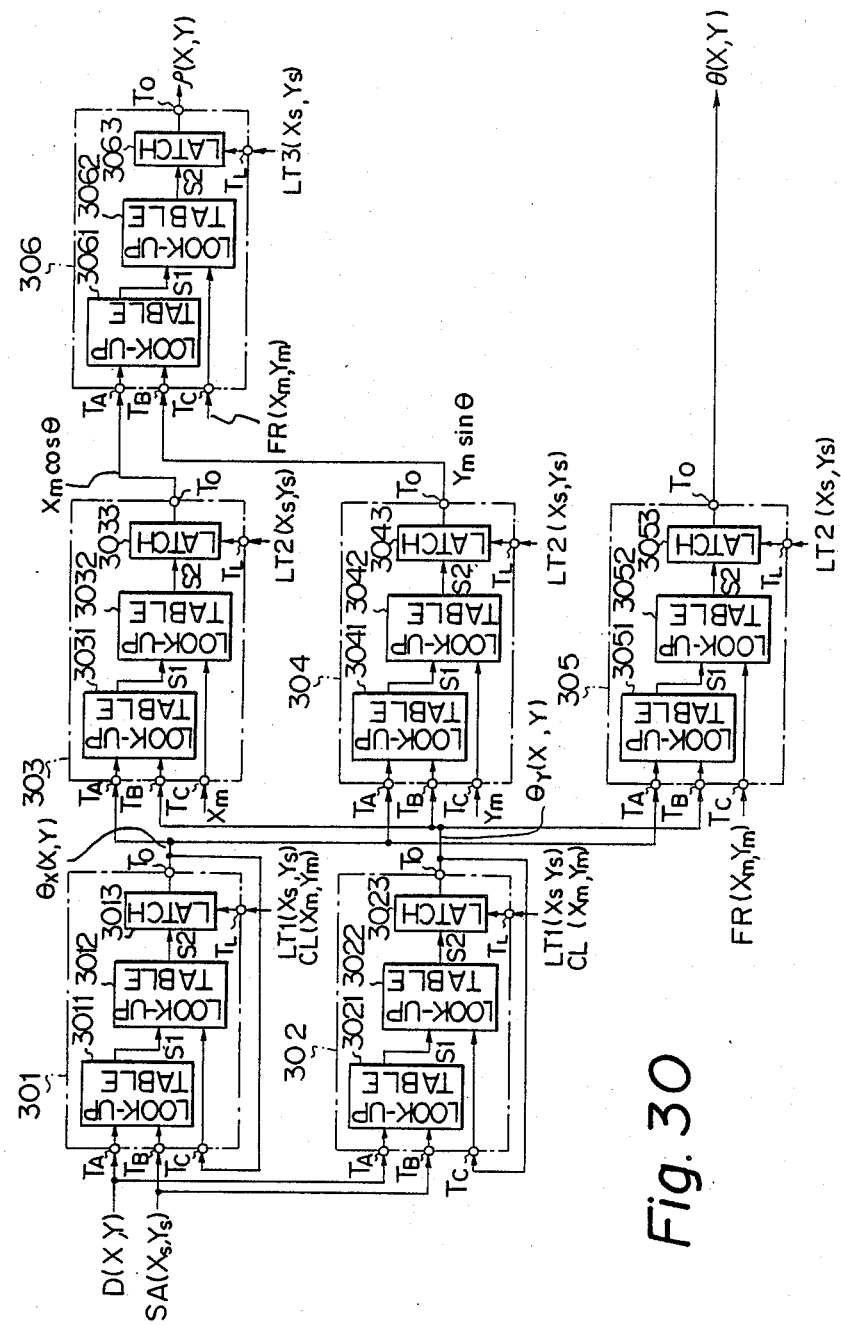
FIG. 30 is a circuit diagram illustrating another image processor system using a plurality of basic processor units according to the present invention.
Figure 31:
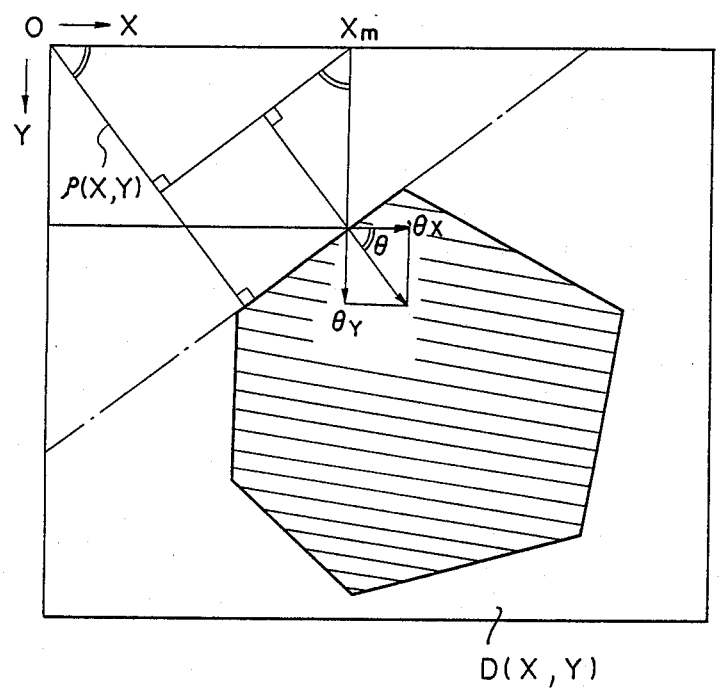
FIG. 31 is a diagram explaining the intercept $\rho$ and the gradient angle $\theta$ of FIG. 30.

FIG. 30 illustrates an image processor system including five basic processor units 301, 302, 303, 304, and 305 according to the present invention. This image processor system is used for a Hough conversion, i.e., calculates an intercept $\rho(X, Y)$ and a gradient angle $\theta(X, Y)$ as illustrated in FIG. 31. The five basic processor units 301, 302, 303, 304, and 305 have the same configuration. Also, basic processor units 301, 302, and 305 are the same as the basic processor unit 91, 92, and 94, respectively, of FIG. 9.

In the basic processor unit 303, the X-direction primary differential value $\theta_X(X, Y)$ of the gray-scale pixel signal D(X, Y) and the Y-direction primary differential value $\theta_Y(X, Y)$ of the gray-scale pixel signal D(X, Y) are supplied to a look-up table 3031, which stores a cosine component of the vector defined by the X-direction and Y-direction primary differential values $\theta_X$ and $\theta_Y$, i.e., $\theta_X/\sqrt{\theta_X^2+\theta_Y^2}$ an area indicated by a combination address of $\theta_X$ and $\theta_Y$. A look-up table 3032 stores a product data between the inputs thereof. A latch circuit 3033 is clocked at each sub 30 scanning, i.e., by each latch timing signal LT2 ($X_s$, $Y_s$), and therefore, a value of $Xm \cos\theta$ is obtained at the terminal $T_0$ of the basic processor unit 303.

Similarly, in the basic processor unit 304, the X-direction primary differential value $\theta_X(X, Y)$ of the gray-scale pixel signal D(X, Y) and the Y-direction primary differential value $\theta_Y(X, Y)$ of the gray-scale pixel signal D(X, Y) are supplied to a look-up table 3041, which stores a sine component of the vector defined by the X-direction and Y-direction primary differential values $\theta_X$ and $\theta_Y$, i.e., $\theta_Y/\sqrt{\theta_X^2+\theta_Y^2}$ in an area indicated by a combination address of $\theta_X$ and $\theta_Y$. A look-up table 3042 stores a product data between the inputs thereof. A latch circuit 3043 is clocked at each sub scanning, i.e., by each latch timing signal LT2($X_S$, $Y_S$), and therefore, a value of $Y_m \sin\theta$ is obtained at the terminal $T_0$ of the basic processor unit 304.

In the basic processor unit 306, the output $Xm \cos\theta$ of the basic processor unit 303 and the output $Y_m \sin\theta$ of the basic processor unit 304 are supplied to a look-up table 3061, which stores addition data between the inputs thereof. Also, a look-up table 3062 stores product data between the inputs thereof. In this case, the frame signal FR is supplied to an input of the look-up table 3062. Further, a latch circuit 3063 is clocked at each sub scanning, i.e., by each latch timing signal LT3($X_S$, $Y_S$), and therefore, a value of ($Xm \cos\theta + Y_m \sin\theta$) is obtained at the terminal $T_0$ of the basic processor unit 306.

Note that the intercept $\rho(X, Y)$ is represently $Xm \cos\theta + Y_m \sin\theta$.

Figure 32:
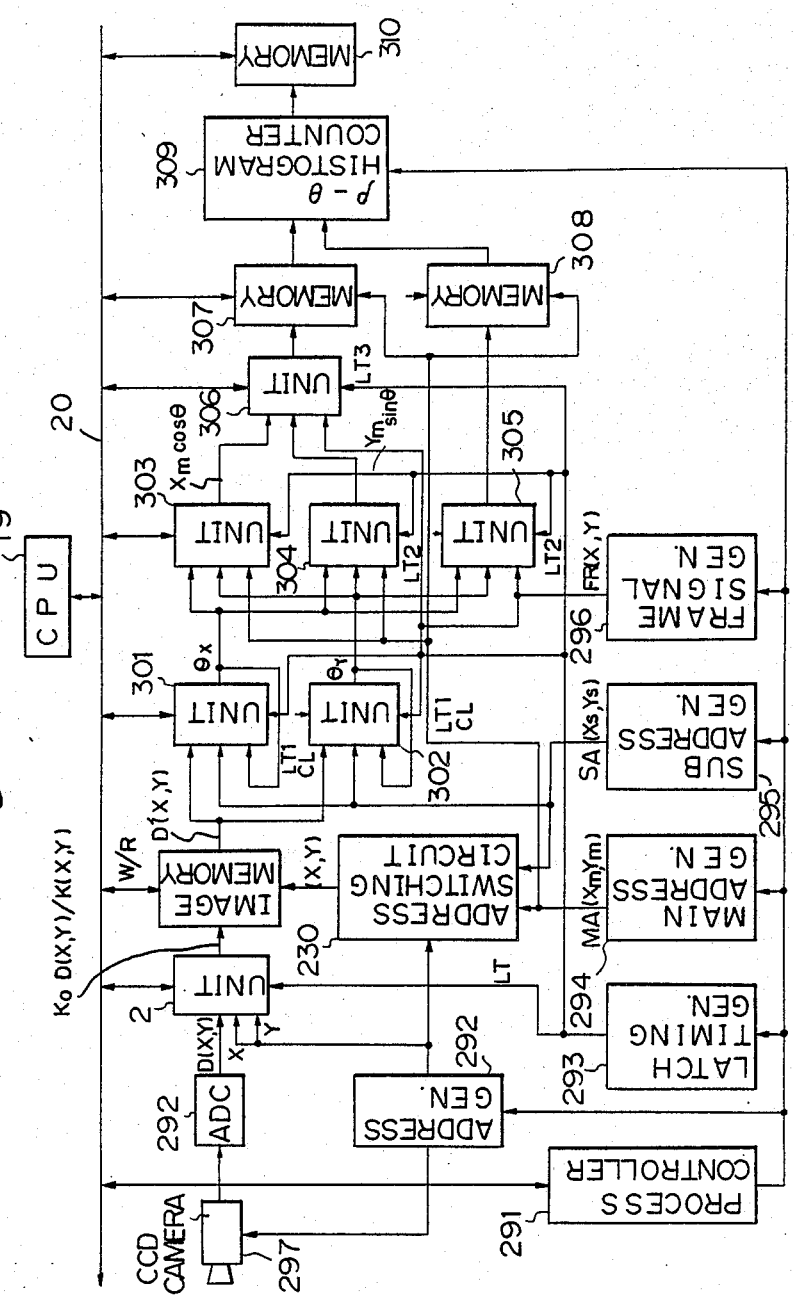
FIG. 32 is another circuit diagram of the entire image processing system according to the present invention.

FIG. 32 is also a block diagram illustrating the entire image processing system using the system of FIG. 30. In FIG. 32, elements, the same as those of FIG. 29 are given the same references. In FIG. 32, the intercept data $\rho(X, Y)$ of the basic processor unit 306 is stored in an area of a memory 307 indicated by an address (X, Y), and the gradient angle data $\theta(X, Y)$ of the basic processor unit 305 is stored in an area of a memory 308 indicated by an address (X, Y). A $\rho - \theta$ histogram counter 309 counts the intercept $\rho(X, Y)$ and the gradient angle $\theta(X, Y)$. Namely, the histogram counter 309 comprises a plurality of counters Nij (i, j = 0, 1, ...) allocated to a plurality of areas divided by the parameters $\rho$ and $\theta$. For example,

| $\theta$ | $\rho$ | | | |
|---|---|---|---|---|
| | $\rho 0$ | $\rho 1$ | $\rho 2$ | $\rho 3 \ldots$ |
| $\theta 0$ | N00 | N01 | N02 | N03 ... |
| $\theta 1$ | N10 | N11 | N12 | N13 ... |
| $\theta 2$ | N20 | N21 | N22 | N23 ... |
| $\theta 3$ | N30 | N31 | N32 | N33 ... |
| . | . | . | . | . |
| . | . | . | . | . |
| . | . | . | . | . |

Such counter values are stored in a memory 310.

Note that the circuits of FIGS. 24 and 29 can be operated without the CPU 19, if the other elements are modified.

As explained above, according to the present invention, various desired functions can be obtained by changing the contents of the look-up tables in the basic processor unit, and by a combination of a plurality of such basic processor units.

We claim:
1. An image processor system comprising:
   a first two-dimensional look-up table for receiving an X-direction primary differential signal and a Y-direction primary differential signal of a gray-scale pixel and generating an absolute value of a vector defined by said X-direction and Y-direction primary differential signals;
   means for storing a sign showing that said absolute value is larger than a threshold value;
   a second two-dimensional look-up table for receiving said X-direction primary differential signal and said Y-direction primary differential signal of said gray-scale pixel and generating an angle value of said vector defined by said X-direction and Y-direction primary differential signals;
   means for storing omnidirectional information dependent upon said angle value;
   means for selecting a gray-scale pixel having said sign;
   determining two gray-scale pixels adjacent to said selected gray-scale pixel in dependency upon said angle value of said selected gray-scale pixel; and
   determining whether said selected gray-scale pixel is on a ridge line by comparing said absolute value of said selected gray-scale pixel with absolute values of said two adjacent gray-scale pixels.

2. A system as set forth in claim 1, further comprising means for storing said absolute value with said sign in relation to an address of said gray-scale pixel.

3. A system as set forth in claim 1, further comprising means for storing said angle value in relation to an address of said gray-scale pixel.

4. A system as set forth in claim 3, wherein upper bits of said angle value show said direction information.

5. A system as set forth in claim 4, wherein said direction information is omnidirectional.

6. A system as set forth in claim 1, further comprising means for storing ridge line data in relation to an address of said selected gray-scale pixel which is determined to be on a ridge line.

7. A system as set forth in claim 1, further comprising:
means for scanning a gray-scale pixel on said ridge line;
means for calculating a length between said scanned gray-scale pixel and a start gray-scale pixel;
means for comparing said length with a threshold length;
means for calculating an angle change between said angle of said scanned gray-scale pixel and said angle of said start gray-scale pixel;
means for comprising said angle change with a threshold to said angle change;
means for making said scanning pixel an end gray-scale pixel of a segment and a start gray-scale pixel of a next segment when said length is larger than said threshold length and said change is larger than said threshold change;
means for repeating the operation of the above-mentioned means to obtain a plurality of segments approximate to said ridge line.

8. A system as set forth in claim 7, wherein said threshold length and said threshold change are variable.

9. An image processor system comprising:
a video camera for converting a scene of an object into an analog electrical signal;
means for performing an A/D conversion upon the analog electrical signal into a gray-scale pixel signal;
means for storing said gray-scale pixel signal of said A/D conversion means;
means for calculating an X-direction primary differential value of a gray-scale pixel in accordance with said stored gray-scale signal;
means for calculating a Y-direction primary differential value of said gray-scale pixel in accordance with said stored gray-scale signal;
means for calculating an absolute value of a vector defined by said X-direction and Y-direction primary differential values of said gray-scale pixel;
means for storing a sign showing that said absolute value is larger than a threshold value;
means for calculating an angle value of said vector defined by said X-direction and Y-direction primary differential values;
means for storing omnidirectional information dependent upon said angle value;
means for selecting a gray-scale pixel having said sign;
determining two gray-scale pixels adjacent to said selected gray-scale pixel in dependency upon said angle value of said selected gray-scale pixel; and
determining whether said selected gray-scale pixel is on a ridge line by comparing said absolute value of said selected gray-scale pixel with values of said two adjacent gray-scale pixels.

10. A system as set forth in claim 9, further comprising means for storing said absolute value with said sign in relation to an address of said gray-scale pixel.

11. A system as set forth in claim 9, further comprising means for storing said angle value in relation to an address of said gray-scale pixel.

12. A system as set forth in claim 11, wherein upper bits of said angle value show said direction information.

13. A system as set forth in claim 12, wherein said direction information is omnidirectional.

14. A system as set forth in claim 9, further comprising means for storing ridge line data in relation to an address of said selected gray-scale pixel which is determined to be on a ridge line.

15. A system as set forth in claim 9, further comprising:
means for scanning a gray-scale pixel on said ridge line;
means for calculating a length between said scanned gray-scale pixel and a start gray-scale pixel;
means for comparing said length with a threshold length;
means for calculating an angle change between said angle of said scanned gray-scale pixel and said angle of said start gray-scale pixel;
means for comparing said angle change with a threshold to said angle change;
means for making said scanning pixel an end gray-scale pixel of a segment and a start gray-scale pixel of a next segment when said length is larger than said threshold length and said change is larger than said threshold change;
means for repeating the operation of the above-mentioned means to obtain a plurality of segments approximate to said ridge line.

16. A system as set forth in claim 15, wherein said threshold length and said threshold change are variable.

17. A basic processor unit for receiving an X-address input digital signal and a Y-address input digital signal of a gray-scale pixel and a digital gray-scale signal of said pixel and generating an output digital signal representing a function of said input digital signals, comprising:
a first two-dimensional look-up table for receiving said X-address and a Y-address input digital signals, generating an output digital signal from an area accessed by an address defined by said X- and Y-input digital signals, and for storing a distribution function for a pixel extraction area defined by said X-address signal and said Y-address signal;
a second two-dimensional look-up table, connected to said first two-dimensional look-up table, for receiving said output digital signal of said first two-dimensional look-up table and said digital gray-scale signal, and generating an output digital signal from an area accessed by said output digital signal of said first two-dimensional look-up table and said digital gray-scale signal, said second look-up table storing product data between two inputs thereof; and
a latched circuit, connected to said second look-up table, for temporarily storing said output digital signal of said second look-up table.

18. A basic processor unit for receiving an X-address input digital signal and a Y-address input digital signal of a gray-scale pixel and a digital gray-scale signal of said pixel and generating an output digital signal representing a function of said input digital signals, comprising:

a first two-dimensional look-up table for receiving said X-address and Y-address input digital signals, and generating an output digital signal from an area accessed by an address defined by said X-address and Y-address input digital signals, said first look-up tables storing a correction value of sensitivity for each pixel defined by said X-address signal and said Y-address signal;

a second two-dimensional look-up table, connected to said first two-dimensional look-up table, for receiving said output digital signal of said first two-dimensional look-up table and said digital gray-scale signal, and generating an output digital signal from an area accessed by said output digital signal of said first two-dimensional look-up table and said digital gray-scale signal, said second look-up table storing product data between two inputs thereof; and a latch circuit, connected to said second look-up table, for temporarily storing said output digital signal of said second look-up table.

19. A basic processor unit as set forth in claim 18, wherein said correction values for a plurality of predetermined regions of said second look-up table are larger than those for the other regions.

20. A basic processor unit for receiving a first input digital signal, and a second input digital signal and a third input digital signal and generating an output digital signal representing a function of said input digital signals, wherein said first input digital signal is a gray-scale signal of a gray-scale pixel defined by a combination address of a main scanning address and a subscanning address, said second input digital signal being a subscanning address signal of a subscanning address, said third input digital signal being an output signal of a latched circuit, comprising:

a first two-dimensional look-up table for receiving said first and second input digital signals and generating an output digital signal from an area accessed by an address defined by said first and second input digital signals, said first look-up table storing product data between said gray-scale signal and a weight coefficient corresponding to said subscanning address signal;

a second two-dimensional look-up table, connected to said first two-dimensional look-up table, for receiving said output digital signal of said first two-dimensional look-up table and said third input digital signal, and generating an output digital signal from an area accessed by said output digital signal of said first two-dimensional look-up table and said third input digital signal, said second look-up table storing sum data between two inputs thereof; and a latch circuit, connected to said second look-up table, for temporarily storing said output digital signal of said second look-up table, said latch circuit being cleared before each subscanning by said subscanning address signal, said latch circuit storing the output signal of said second look-up table after each said subscanning address signal is changed, thereby obtaining a convolution of a pixel defined by said main scanning address at said latch circuit after the change of each said subscanning address signal is terminated.

21. A basic processor unit as set forth in claim 20, wherein said weight coefficient is determined so that said basic processor unit serves as an X-direction or Y-direction primary differential filter.

22. A basic processor unit for receiving a first input digital signal and a second input digital signal and a third input digital signal and generating an output digital signal representing a function of said input digital signals, wherein said first and second input digital signals are an X-direction primary differential signal and a Y-direction primary differential signal, respectively, of a gray-scale pixel signal, said third input digital signal being a frame signal for determining effective pixels, comprising:

a first two-dimensional look-up table for receiving said first and second input digital signals and generating an output digital signal from an area accessed by an address defined by said first and second input digital signals, said first look-up table storing an absolute value of a vector defined by said X-direction and Y-direction primary differential signals in an area indicated by a combination address of said X-direction and Y-direction primary differential signals;

a second two-dimensional look-up table connected to said first two-dimensional look-up table, for receiving said output digital signal of said first two-dimensional look-up table and said third input digital signal, and generating an output digital signal from an area accessed by said output digital signal of said first two-dimensional look-up table and said third input digital signal, said second look-up table storing product data between two inputs thereof; and a latch circuit, connected to said second look-up table, for temporarily storing said output digital signal of said second look-up table.

23. A basic processor unit for receiving a first input digital signal and a second input digital signal and a third input digital signal and generating an output digital signal representing a function of said input digital signals, wherein said first and second input digital signals are an X-direction primary differential signal and a Y-direction primary differential signal, respectively, of a gray-scale pixel signal, said third input digital signal being a frame signal for determining effective pixels, comprising:

a first two-dimensional look-up table for receiving said first and second input digital signals, and generating an output digital signal from an area accessed by said first and second input digital signals, said first look-up table storing an angle value of a vector defined by said X-direction and Y-direction primary differential signals in an area indicated by a combination address of said X-direction and Y-direction primary differential signals;

a second two-dimensional look-up table, connected to said first two-dimensional look-up table, for receiving said output digital signal of said first two-dimensional look-up table and said third input digital signal, and generating an output digital signal from an area accessed by said output digital signal of said first two-dimensional look-up table and said third input digital signal, said second look-up table storing product data between two inputs thereof; and a latch circuit, connected to said second look-up table, for temporarily storing said output digital signal of said second look-up table.

24. A basic processor unit for receiving a first input digital signal and a second input digital signal and a third input digital signal and generating an output digital signal representing a function of said input digital signals, wherein said first and second input digital signals are an X-direction primary differential signal and a Y-direction primary differential signal, respectively, of a gray-scale pixel signal, said third input digital signal being X-direction data of said gray-scale pixel signal, comprising:

a first two-dimensional look-up table for receiving said first and second input digital signals and generating an output digital signal from an area accessed by an address defined by said first and second input digital signals, said first look-up table storing a cosine component value of a vector defined by said X-direction and Y-direction primary differential signals in an area indicated by a combination address of said X-direction and Y-direction primary differential signals;

a second two-dimensional look-up table connected to said first two-dimensional look-up table for receiving said output digital signal of said first two-dimensional look-up table and said third input digital signal and generating an output digital signal from an area accessed by said output digital signal of said first two-dimensional look-up table and said third input digital signal, said second look-up storing product data between two inputs thereof; and a latch circuit, connected to said second look-up table for temporarily storing said output digital signal of said second look-up table.

25. A basic processor unit for receiving a first input digital signal and a second input digital signal and a third input digital signal and generating an output digital signal representing a function of said input digital signals, wherein said first and second input digital signals are an X-direction primary differential signal and a Y-direction primary differential signal, respectively, of a gray-scale pixel signal, said third input digital input signal being a Y-direction address data of said gray-scale pixel signal, comprising:

a first two-dimensional look-up table for receiving said first and second input digital signals and generating an output digital signal from an area accessed by an address defined by said first and second input digital signals, said first look-up table storing a sine component value of a vector defined by X-direction and Y-direction primary differential signals in an area indicated by a combination address of said X-direction and Y-direction primary differential signals;

a second two-dimensional look-up table, connected to said first two-dimensional look-up table, for receiving said output digital signal of said first two-dimensional look-up and said third input digital signal, and generating an output digital signal from an area accessed by said output digital signal of said first two-dimensional look-up table and said third digital signal, said second look-up table storing product data between two inputs thereof; and a latch circuit, connected to said second look-up table, for temporarily storing said output digital signal of said second look-up table.

26. A basic processor unit for receiving a first input digital signal and a second input digital signal and a third input digital signal and generating an output signal representing a function of said input digital signals, wherein said first input digital signal is a product data between an X-address signal of a gray-scale pixel and a cosine component of a primary differential vector defined by an X-direction primary differential signal and a Y-direction primary differential signal, respectively, of a gray-scale pixel signal, said second input digital signal being a product data between a Y-address scale of said gray-scale pixel and a sine component of said primary differential vector, and said third input signal being a frame signal for determining effective pixels, comprising:

a first two-dimensional look-up table for receiving said first and second input digital signals and generating an output digital signal from an area accessed by an address defined by said first and second input digital signals, said first look-up table storing additional data of the inputs therebetween;

a second two-dimensional look-up table, connected to said first two-dimensional look-up table, for receiving said output digital signal of said first two-dimensional look-up table and said third input digital signal, and generating an output digital signal from an area accessed by said output digital signal of said first two-dimensional look-up table and said third input digital signal, said second look-up table storing product data between two inputs thereof; and a latch circuit, connected to said second look-up table, for temporarily storing said output digital signal of said second look-up table.

\* \* \* \* \*

UNITED STATES PATENT AND TRADEMARK OFFICE
CERTIFICATE OF CORRECTION

PATENT NO.    : 4,982,342
DATED         : January 1, 1991
INVENTOR(S)   : Hiroshi Moribe, et al It is certified that error appears in the above-identified patent and that said Letters Patent is hereby corrected as shown below:

Title Page, Item [73]: Under the heading "Assignee", the second Assignee should be included; namely, --NIPPONDENSO CO., LTD., Aichi, Japan--.

Signed and Sealed this

Eleventh Day of August, 1992

Attest:

DOUGLAS B. COMER

*Attesting Officer*   Acting Commissioner of Patents and Trademarks